United States Patent
Gopal et al.

(10) Patent No.: US 12,052,733 B2
(45) Date of Patent: Jul. 30, 2024

(54) SUBSCRIBER IDENTIFICATION MODULE PRIORITIZATION TECHNIQUES BASED ON SERVICE PRIORITY AND QUALITY OF SERVICE PARAMETERS

(71) Applicant: QUALCOMM Incorporated, San Diego, CA (US)

(72) Inventors: Thawatt Gopal, San Diego, CA (US); Sridhar Bandaru, Westminster, CO (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 17/504,906

(22) Filed: Oct. 19, 2021

(65) Prior Publication Data

US 2023/0117026 A1 Apr. 20, 2023

(51) Int. Cl.
 *H04W 72/51* (2023.01)
 *H04W 8/20* (2009.01)
 (Continued)

(52) U.S. Cl.
 CPC ............ *H04W 72/51* (2023.01); *H04W 8/20* (2013.01); *H04W 72/543* (2023.01); *H04W 88/06* (2013.01)

(58) Field of Classification Search
 CPC ..... H04W 72/51; H04W 72/543; H04W 8/20; H04W 88/06
 (Continued)

(56) References Cited

U.S. PATENT DOCUMENTS 8,849,350 B1 * 9/2014 Batchu ................ H04W 8/183
 455/558
2017/0181071 A1 * 6/2017 Lipka .................. H04W 48/18
 (Continued)

FOREIGN PATENT DOCUMENTS

EP 3255942 A1 12/2017
GB 2502969 A 12/2013

OTHER PUBLICATIONS

3GPP TS 23.203 version 15.4.0 Release 15, Sep. 2018, Table 6.1.7, p. 51-53 (Year: 2018).*
 (Continued)

*Primary Examiner* — Xuan Lu
(74) *Attorney, Agent, or Firm* — Dalei Dong; Holland & Hart LLP

(57) ABSTRACT

Methods, systems, and devices for wireless communications are described that support subscriber identification module (SIM) prioritization based on service priority and quality of service (QoS) parameters. A user equipment (UE) may identify a set of available RF components for communications at the UE that may be shared between a first SIM and a second SIM. The UE may identify multiple resource partitions of the set of available RF components, each resource partition providing resources for contemporaneous communications of both the first SIM and the second SIM. The UE may select one of the resource partitions for the contemporaneous communications based on service level priorities associated with each SIM and which resource partition provides sufficient RF resources to satisfy the QoS parameters associated a highest service level priority of the multiple SIMS.

30 Claims, 16 Drawing Sheets

(51) Int. Cl.
   *H04W 12/45* (2021.01)
   *H04W 28/24* (2009.01)
   *H04W 72/543* (2023.01)
   *H04W 88/06* (2009.01)

(58) Field of Classification Search
   USPC .......................................................... 370/329
   See application file for complete search history.

(56) References Cited

U.S. PATENT DOCUMENTS

| | | | |
|---|---|---|---|
| 2018/0041953 A1* | 2/2018 | Lindoff | H04W 48/20 |
| 2019/0037386 A1* | 1/2019 | Dawid | H04W 36/023 |
| 2021/0029205 A1 | 1/2021 | Dandra et al. | |
| 2021/0112399 A1 | 4/2021 | Gopal et al. | |
| 2021/0127256 A1 | 4/2021 | Li et al. | |
| 2022/0038987 A1* | 2/2022 | Sinha | H04W 48/10 |
| 2022/0053606 A1* | 2/2022 | Jeong | H04W 8/183 |
| 2022/0104103 A1* | 3/2022 | Lee | H04W 36/00837 |
| 2022/0132299 A1* | 4/2022 | Bhowmik | H04W 76/12 |
| 2022/0191824 A1* | 6/2022 | Kumar | H04W 68/02 |
| 2022/0272688 A1* | 8/2022 | Lee | H04W 72/0453 |
| 2022/0286839 A1* | 9/2022 | Zhao | H04W 76/16 |
| 2022/0418020 A1* | 12/2022 | Adjakple | H04W 72/1215 |

OTHER PUBLICATIONS

3GPP TS 23.501 version 16.6.0 Release 16 , Oct. 2020, Table 5.7.4-1, p. 148-151 (Year: 2020).*
International Search Report and Written Opinion—PCT/US2022/044578—ISA/EPO—Jan. 16, 2023 (2107871WO).

* cited by examiner

Reference Signal(s) 215

Measurement Report 220

SUBSCRIBER IDENTIFICATION MODULE PRIORITIZATION TECHNIQUES BASED ON SERVICE PRIORITY AND QUALITY OF SERVICE PARAMETERS

FIELD OF TECHNOLOGY

The following relates to wireless communications, including subscriber identification module prioritization techniques based on service priority and quality of service parameters.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a UE may communicate with a base station using uplink and downlink communications, in which different antennas may be used for uplink transmissions and for downlink receptions. In such systems, it may be appropriate for the UE to support techniques for antenna selection of antennas for uplink and downlink communications.

SUMMARY

The described techniques relate to improved methods, systems, devices, and apparatuses that support subscriber identification module (SIM) prioritization techniques based on service priority and quality of service (QoS) parameters. In accordance with various aspects, the described techniques provide for selection of radio frequency (RF) components at a user equipment (UE) for communications associated with multiple SIMs using a dual-SIM dual-active (DSDA) configuration. In some cases, a UE may identify a set of available resources for communications at the UE, where the set of available resources include multiple RF components (e.g., transmit/receive antennas, transmit/receive chains, transmit power amplifiers (PAs), receive low noise amplifiers (LNAs), band select switches, other RF frond-end components, or any combinations thereof). Components of the set of available resources may be shared between a first SIM and a second SIM. In some cases, the UE may identify multiple resource partitions of the set of available resources, each resource partition providing resources for contemporaneous communications of both the first SIM and the second SIM. The UE may select one of the resource partitions for the contemporaneous communications based on service level priorities associated with each SIM and which first resource partition provides resources to satisfy QoS parameters associated a highest service level priority.

A method for wireless communication is described. The method may include identifying a set of available resources for communications at the user equipment (UE) that include at least one radio frequency component, the at least one radio frequency component is shared between a first subscriber identification module (SIM) and a second subscriber identity module (SIM), identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous, receiving a first set of quality of service parameters and a first service level priority associated with the first SIM, and a second set of quality of service parameters and a second service level priority associated with the second SIM, the first service level priority having a higher priority than the second service level priority, and selecting one of the first resource partition or the second resource partition for communications based on the first service level priority and which of the first resource partition or the second resource partition provides resources to satisfy the first set of quality of service parameters.

An apparatus for wireless communication is described. The apparatus may include a processor, memory coupled with the processor, and instructions stored in the memory. The instructions may be executable by the processor to cause the apparatus to identify a set of available resources for communications at the UE that include at least one radio frequency component, the at least one radio frequency component is shared between a first SIM and a second SIM, identify a first resource partition of the set of available resources and a second resource partition of the set of available resources, the first resource partition providing first resources for first communications of the first SIM and the second resource partition providing second resources for second communications of the second SIM, and the first communication and the second communication are contemporaneous, receive a first set of quality of service parameters and a first service level priority associated with the first SIM, and a second set of quality of service parameters and a second service level priority associated with the second SIM, the first service level priority having a higher priority than the second service level priority, and select one of the first resource partition or the second resource partition for communications based on the first service level priority and which of the first resource partition or the second resource partition provides resources to satisfy the first set of quality of service parameters.

Another apparatus for wireless communication is described. The apparatus may include means for identifying a set of available resources for communications at the UE that include at least one radio frequency component, the at least one radio frequency component is shared between a first SIM and a second SIM, means for identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous, means for receiving a first set of quality of service parameters and a first service level priority associated with the first SIM, and a second set of quality of service parameters and a second service level priority associated with the second SIM, the first service level priority having a higher priority than the second service level priority, and means for selecting one of the first resource partition or the second resource partition for communications based on the first service level priority and which of the first resource partition or the second resource partition provides resources to satisfy the first set of quality of service parameters.

A non-transitory computer-readable medium storing code for wireless communication is described. The code may include instructions executable by a processor to identify a set of available resources for communications at the UE that include at least one radio frequency component, the at least one radio frequency component is shared between a first SIM and a second SIM, identify a first resource partition of the set of available resources and a second resource partition of the set of available resources, the first resource partition providing first resources for first communications of the first SIM and the second resource partition providing second resources for second communications of the second SIM, and the first communication and the second communication are contemporaneous, receive a first set of quality of service parameters and a first service level priority associated with the first SIM, and a second set of quality of service parameters and a second service level priority associated with the second SIM, the first service level priority having a higher priority than the second service level priority, and select one of the first resource partition or the second resource partition for communications based on the first service level priority and which of the first resource partition or the second resource partition provides resources to satisfy the first set of quality of service parameters.

In some examples of the method, apparatuses, and non-transitory computer-readable medium described herein, the selecting may include operations, features, means, or instructions for determining that the first resource partition provides antenna switching diversity sufficient to meet the first set of quality of service (QoS) parameters and selecting the first resource partition for the concurrent communications of both the first SIM and the second SIM based on the determining. Some examples of the method, apparatuses, and non-transitory computer-readable medium described herein may further include operations, features, means, or instructions for assigning a first subset of receive radio frequency components associated with the first resource partition to the first SIM, the first subset of receive radio frequency components including a first number of receive antennas, selecting a second number of transmit antennas based on one or more measurements at each of the receive antennas, and assigning a remaining number of transmit antennas of the set of available resources to the second resource partition for the second SIM. Some examples of the method, apparatuses, and non-transitory computer-readable medium described herein may further include operations, features, means, or instructions for granting authority to a controller associated with the first SIM to select the first subset of receive radio frequency components and the second number of transmit antennas. Some examples of the method, apparatuses, and non-transitory computer-readable medium described herein may further include operations, features, means, or instructions for providing the controller associated with the first SIM control over one or more radio frequency components including one or more band select switches, antenna switch control, power amplifier control, or any combinations thereof.

In some examples of the method, apparatuses, and non-transitory computer-readable medium described herein, the radio frequency components that are shared among the first SIM and the second SIM include one or more transmit chains, one or more transmit power amplifiers, one or more receive chains, one or more receive low noise amplifiers, one or more antenna switches, one or more antennas, one or more band select switches, or any combinations thereof. In some examples of the method, apparatuses, and non-transitory computer-readable medium described herein, the selecting may include operations, features, means, or instructions for determining that the first resource partition provides a highest capability for transmit antenna selection based on the first QoS parameters and selecting the first resource partition for the concurrent communications of both the first SIM and the second SIM based on the determining.

In some examples of the method, apparatuses, and non-transitory computer-readable medium described herein, the first service level priority and the second service level priority may be determined based on a service level priority order. In some examples of the method, apparatuses, and non-transitory computer-readable medium described herein, the first service level priority and the second service level priority may be further determined based on a mapping between an application associated with communications of each SIM and an associated priority of the application in the service level priority order. In some examples of the method, apparatuses, and non-transitory computer-readable medium described herein, the first service level priority and the second service level priority may be determined at a higher layer protocol level that is above a physical layer protocol level that assigns resource partitions.

In some examples of the method, apparatuses, and non-transitory computer-readable medium described herein, the concurrent communications of both the first SIM and the second SIM are full-concurrency communications and each of the first resource partition and the second resource partition include at least one power amplifier for concurrent transmissions of both the first SIM and the second SIM at any given time instance. In some examples of the method, apparatuses, and non-transitory computer-readable medium described herein, the first resource partition and the second resource partition may be determined based on whether the concurrent communications use a transmit-sharing DSDA configuration or a full-concurrency DSDA configuration.

In some examples of the method, apparatuses, and non-transitory computer-readable medium described herein, the first SIM is allocated resources of the set of available resources in which transmit and receive components are coupled for transmit-sharing DSDA, based on the first service level priority associated with the first SIM. In some examples of the method, apparatuses, and non-transitory computer-readable medium described herein, at least a first transmit component is shared by both the first SIM and the second SIM, and the second SIM suspends communications when the first SIM uses the first transmit component, based on the second service level priority associated with the second SIM. In some examples of the method, apparatuses, and non-transitory computer-readable medium described herein, the second SIM may be allocated resources of the set of available resources in which one or more transmit and receive components are decoupled for transmit-sharing DSDA.

Some examples of the method, apparatuses, and non-transitory computer-readable medium described herein may further include operations, features, means, or instructions for allocating a first antenna of a set of multiple antennas as a first transmit antenna for the first SIM, the first antenna having a highest channel measurement of the set of multiple antennas, and the first antenna being shared with the second SIM for receiving communications of the second SIM, and allocating a second antenna of the set of multiple antennas to the second SIM as a second transmit antenna, to provide decoupled transmit and receive antennas for the second SIM.

DETAILED DESCRIPTION

Figure 1:
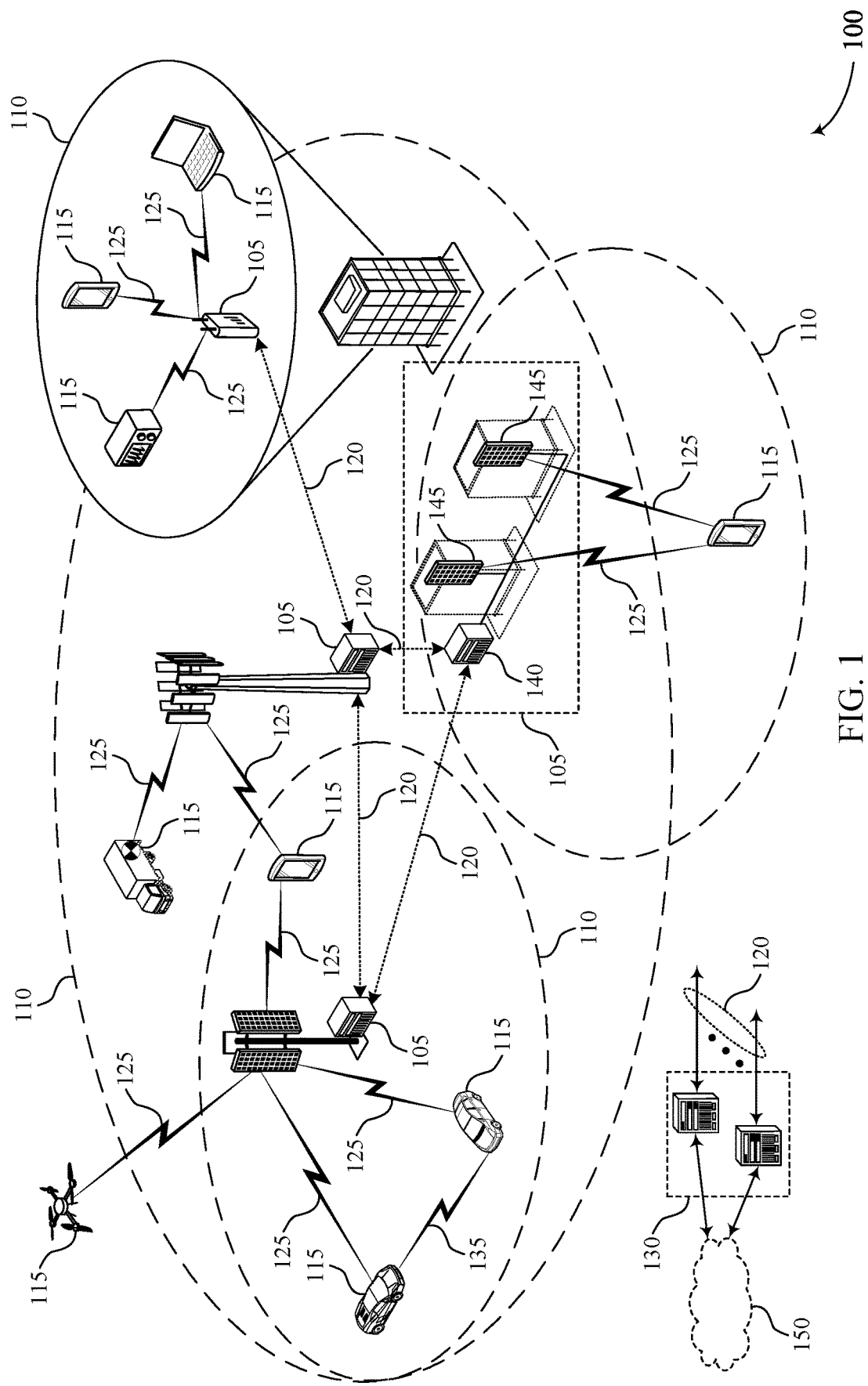
FIG. 1 illustrates an example of a wireless communications system that supports subscriber identification module (SIM) prioritization techniques based on service priority and quality of service parameters in accordance with aspects of the present disclosure.

In some wireless communications systems, a user equipment (UE) may include two or more subscriber identification modules (SIMs), where each SIM is associated with a different network through which the UE may communicate. For example, a first SIM may support communications with a first mobile network operator (MNO) and a second SIM may support communications with a second MNO. Some UEs may support having each of two or more SIMs active concurrently in accordance with dual-SIM dual-active (DSDA) operation, where a first subscriber and second subscriber (e.g., a first SIM and second SIM, which may also be referred to as a first sub and second sub) in connected mode can share RF front-end devices such as transmit chains, transmit power amplifiers (PAs), receive chains, antenna switches, antennas, band select switches, receive low noise amplifiers (LNAs), and the like. Such RF front-end devices or components may be referred to herein as resources or RF resources of a UE.

In some cases, due to limitations of RF resources, allocation of a minimum number of resources for a first SIM, or allowing the first SIM control of shared RF resources, may result in the first SIM being able to support antenna switch diversity for transmitting and receiving communications at the expense of the second SIM not being able to perform antenna switch diversity. Various aspects of the present disclosure provide techniques that support selection of resources of a UE based on SIM prioritization that accounts for service priority and quality of service (QoS) parameters associated with each SIM. In some cases, a UE may identify a set of available resources for communications, where the components of the set of available resources may be shared between a first SIM and a second SIM. In some cases, the UE may identify multiple resource partitions of the set of available resources, each resource partition providing resources for contemporaneous communications of both the first SIM and the second SIM. The UE may select one of the resource partitions for the contemporaneous communications based on service level priorities associated with each SIM and which of the resource partitions provide resources to satisfy QoS parameters associated a highest service level priority.

Such techniques may provide that a UE operating in a DSDA configuration has sufficient or minimum radio resources (e.g., antennas, receivers, antenna switches, etc.) to enable antenna switch diversity on a highest service level priority SIM when there is a choice to provide one SIM (e.g., a first DSDA subscriber or a second DSDA subscriber) with sufficient radio resources to perform antenna switch diversity, but the UE does not have sufficient RF resources to provide both SIMS equivalent or minimum radio resources to perform antenna switch diversity. Techniques as discussed herein may thus provide for more efficient antenna management for UEs operation using DSDA. For example, providing control for the selection of RF resources and antennas based on a SIM having a higher priority may allow for a UE to maintain QoS targets for the higher priority communications, and allow for contemporaneous communications of a different SIM with lower priority communications. Such techniques may thus enhance UE efficiency, increase data rates, and provide for enhanced user experience.

Aspects of the disclosure are initially described in the context of wireless communications systems. Examples of SIM prioritization and antenna selection techniques are then described. Aspects of the disclosure are further illustrated by and described with reference to apparatus diagrams, system diagrams, and flowcharts that relate to SIM prioritization techniques based on service priority and quality of service parameters.

FIG. 1 illustrates an example of a wireless communications system 100 that supports SIM prioritization techniques based on service priority and quality of service parameters in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may support DSDA communications in which communications associated with multiple SIMs may be contemporaneously performed at the UE 115. Various techniques provided herein describe that such UEs 115 may support SIM prioritization based on service priority and QoS parameters. In some cases, a UE 115 may identify a set of available resources for communications, where components of the set of available resources may be shared between a first SIM and a second SIM. In some cases, the UE 115 may identify multiple resource partitions of the set of available resources, each resource partition providing resources for contemporaneous communications of both the first SIM and the second SIM. The UE 115 may select one of the resource partitions for the contemporaneous communications based on service level priorities associated with each SIM and which of the first resource partition or the second resource partition provides resources to satisfy the QoS parameters associated a highest service level priority.

Figure 2:
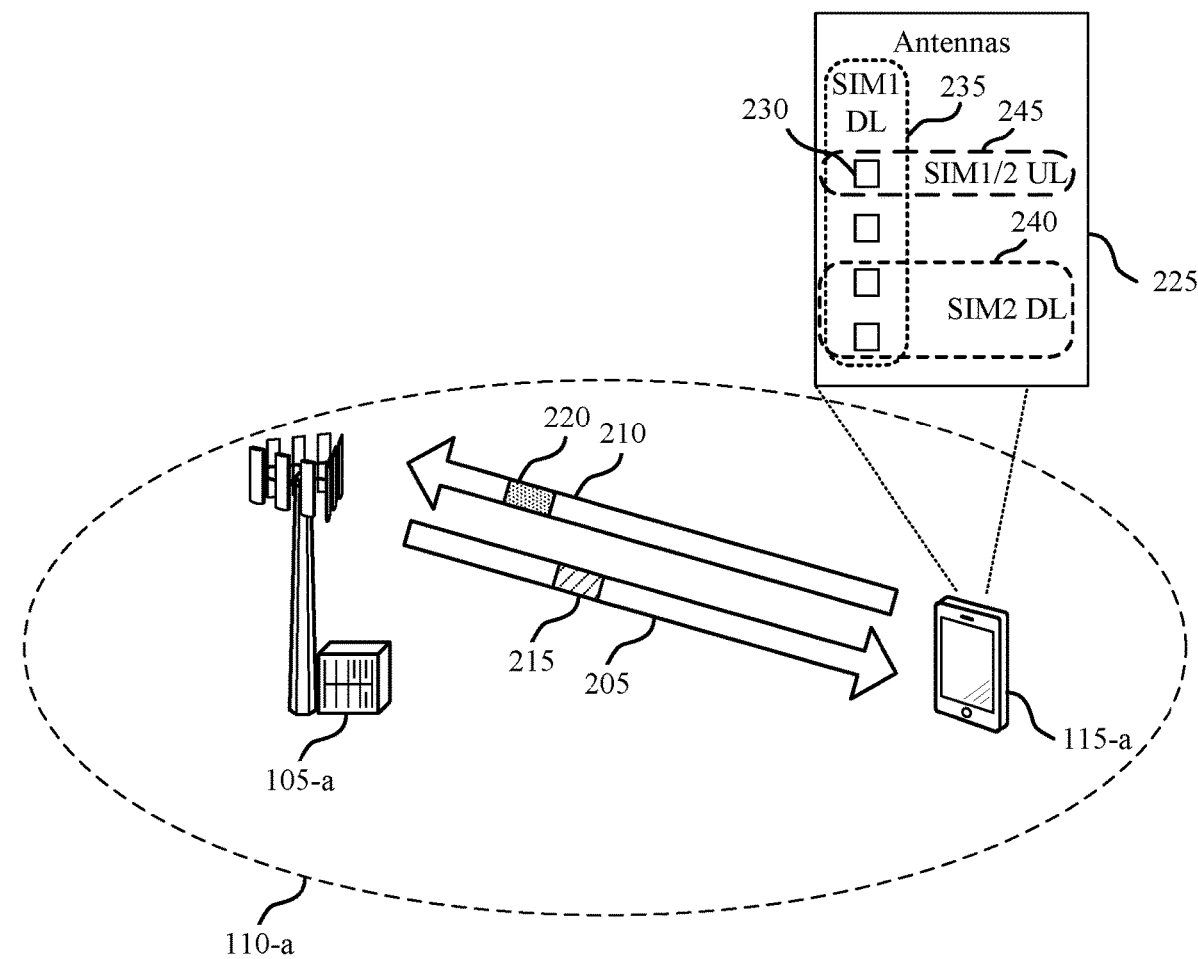
FIG. 2 illustrates an example of a portion of a wireless communications system that supports SIM prioritization techniques based on service priority and quality of service parameters in accordance with aspects of the present disclosure.
Figure 2:
Figure 2:

FIG. 2 illustrates an example of a wireless communications system 200 that supports SIM prioritization techniques based on service priority and quality of service parameters in accordance with aspects of the present disclosure. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. Base station 105-a may provide network coverage for geographic coverage area 110-a. The base station 105-a may transmit downlink communications 205 to the UE 115-a, and the UE 115-a may transmit uplink communications 210 to the base station 105-a.

To support communications between base station 105-a and UE 115-a, the base station 105-a may transmit one or more reference signals 215 (e.g., channel state information (CSI) reference signals, synchronization signal blocks (SSBs), demodulation reference signals (DMRSs), tracking reference signals (TRSs), and the like). The UE 115-a may measure one or more metrics of received reference signals 215 and provide a measurement report 220 to the base station 105-a. The UE 115-a, in some cases, may identify one or more antennas for use in uplink and downlink communications based on one or more metrics from the measurements of the reference signals 215. For example, the UE 115-a may have an antenna system 225 that includes a number of antenna elements 230 that form a set of available antenna elements 230. In some cases, the antenna system 225 may include one or more antenna panels that may each include a number of antenna elements 230. While four antenna elements 230 are illustrated in FIG. 2, other UEs may have more or fewer antennas.

In some cases, a UE 115-a may have multiple SIMs and be capable of contemporaneous communications associated with each SIM. For example, UE 115-a may have a first SIM and a second SIM, and operate according to a DSDA configuration. Such a DSDA configuration may a UE with enhanced capability for multiple different communications with multiple different networks in a concurrent manner. In order to reduce costs and hardware component space, in some cases two or more SIMs may share a same set of RF components (e.g., antenna system 225, which may include transmit/receive chains, antennas, transmit PAs, receive LNAs, antenna switch components, or any combinations thereof). When one or both SIMS use MIMO communications, antenna switch diversity (ASDIV) may be desired in which transmit antennas are selected from available receive antennas based on measurements of the receive antennas (e.g., highest receive antenna RSRPs based on measurements of reference signals 215 may be selected for uplink antennas). However, if both SIMs are in connected mode and providing a service, ASDIV antenna selections at one of the SIMs may preclude the other SIM from obtaining RF resources at the UE 115-a that are sufficient to provide the service that is active at the other SIM. If a high priority SIM is simply given priority over the resources, it can result in the lower priority SIM being starved of resources, which can result in latency exceeding latency thresholds and reduce communications quality. Techniques such as discussed herein for prioritizing SIMS when operating in an DSDA configuration may allow RF resources at the UE 115-a to be provided to a higher priority SIM such that QoS targets are more likely to be met, while also providing RF resources to a lower priority SIM.

In some cases, the UE 115-a may prioritize SIMs based on a service priority order of communications at each SIM. In some cases, multiple different resource partitions may be identified (e.g., based on frequency bands used by each SIM and different antennas and RF components that are configured for different bands) for sharing of common RF component resources by multiple SIMS. For example, a first SIM having a higher priority service may be identified, and a resource partition selected that meets a QoS target of the higher priority service. In the example of FIG. 2, the first SIM may be given control to select a first set of downlink antennas 235 that include four antenna elements 230. In this case, a first uplink antenna 245 may be selected for the first SIM based on measurements of each of the first set of downlink antennas 235. The second SIM in this example may have a lower priority service, and may select a second set of downlink antennas 240, which do not include the first uplink antenna 245. In this example, both SIMS may share the first uplink antenna 245, and the second SIM may have uncoupled uplink and downlink antennas.

In some cases, two or more resource partitions meet the QoS target for the higher priority service, and the resource partition with the fewest resources for the higher priority service may be selected in order to provide resources to the lower priority service. In the event that each resource partition provides sufficient resources to meet the QoS target of both the higher priority service and the lower priority service, the resource partition that provides the most resources to the higher priority service may be selected.

In one example, the first resource partition for the first SIM may have four receive antennas and operate in frequency band N1, and the second SIM may operate in frequency band N3 and have two receive antennas. In this example, both SIMs share a same transmit antenna (e.g., due to N3 and N1 being mid-band groups whereby in this example only a single-PA is supported for bands in the mid-band RF group). Further, a second resource partition for the first SIM may have two receive antennas on N1 and the second SIM may have four receive antennas on N3, with a shared transmit antenna. In some cases, the first SIM may have a highest service level priority, and the resource allocation option provides a highest capability with respect to transmit antenna selection options may be assigned to the highest service level priority SIM. Thus, in this example, the first resource partition provides four receive antennas that can be used of for antenna measurements and allows transmit ASDIV across the corresponding four antennas for the first SIM. The second resource partition in this example, provides two receive antennas and thus allows transmit ASDIV across corresponding two antennas. Thus, the first resource partition is preferred for RF resource allocation for the first SIM due to providing transmit ASDIV across more antennas. Control of such RF resources which are shared but used for ASDIV to the highest service level priority SIM may thus allow for enhanced reliability for the higher priority communications. In other cases, if the first SIM had a lower service priority, the first SIM would be allocated the second resource partition.

In some cases, service level priority for each SIM may be determined based on a set of service level priorities. For example, a mobile DSDA service level priority may have a priority order of (1) active voice (i.e., active voice calls have a highest priority), (2) gaming, (3) voice signaling (e.g., IMS signaling, up to caller identification), (4) hold voice (e.g., a voice call having a hold state), and (5) best effort data or other signaling (e.g., MMS/SMS). In other cases, different priority orders for different services may be used, and such different priority orders are within the scope of the present disclosure. In some cases, a higher layer may provide an indication of a service associated with each SIM, and different services may be mapped to associated service level priorities. Such techniques provides capability for a mobile DSDA device to prioritize SIMs for ASDIV RF resource and control based on service level priority to help ensure QoS targets of a highest priority SIM are achieved.

Figure 3:
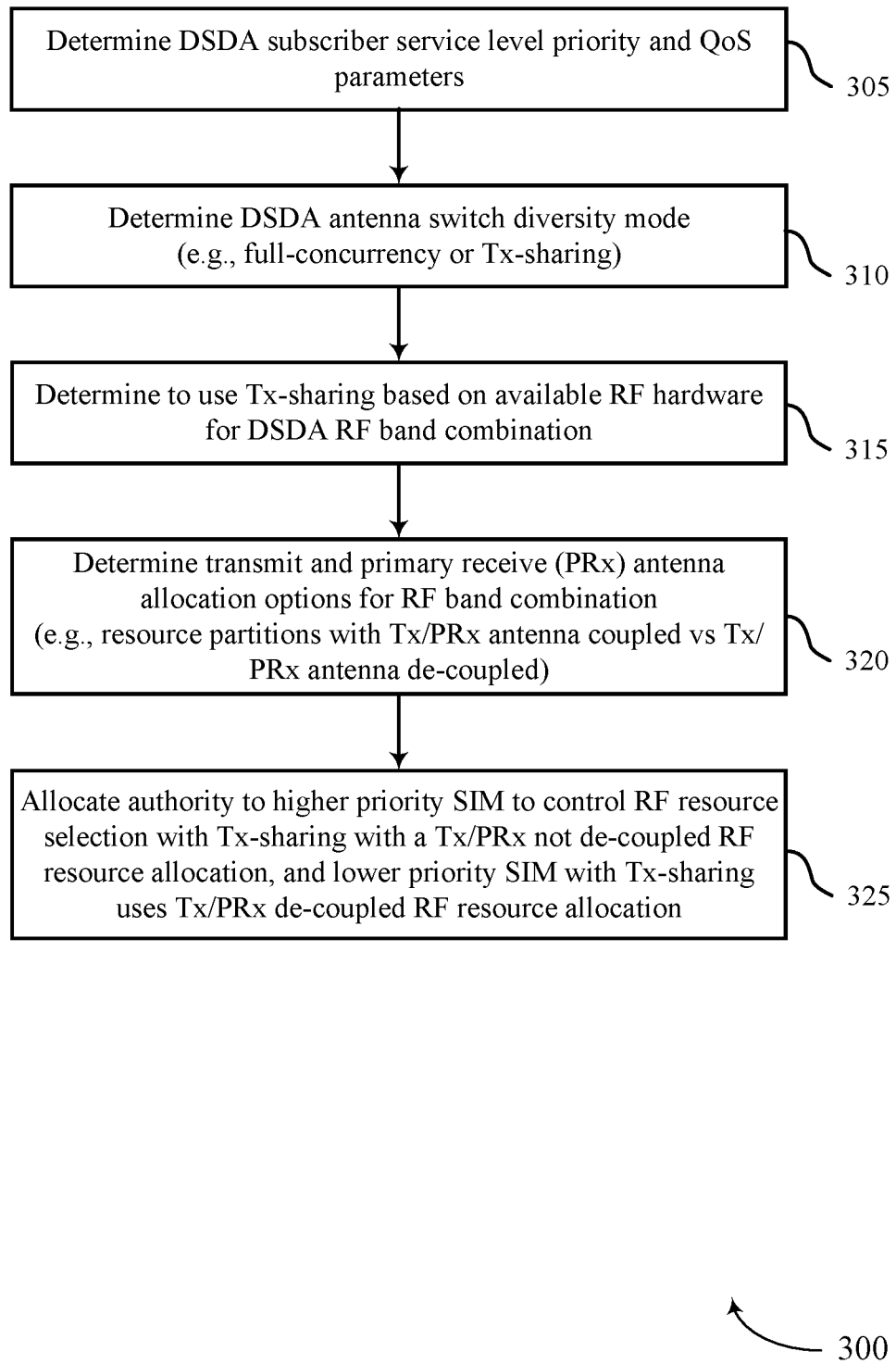
FIG. 3 shows a flow chart that illustrates a method that supports SIM prioritization techniques based on service priority and quality of service parameters in accordance with aspects of the present disclosure.

FIG. 3 illustrates an example of a flow chart that illustrates a method 300 that supports SIM prioritization techniques based on service priority and quality of service parameters in accordance with aspects of the present disclosure. The operations of the method 300 may be implemented by a UE or its components as described herein. For example, the operations of the method 300 may be performed by a UE 115 as described with reference to FIGS. 1 and 2, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 3 may be performed in a different order than the example order shown, or the operations performed may be performed in different orders or at different times. Some operations may be combined or omitted and other operations may be added to the method 300.

In this example, at 305, the UE may determine a DSDA subscriber service level priority and QoS requirements. In some cases, service level priorities and QoS requirements may be determined for multiple SIMs based on services that are active at each SIM. The service level priorities may be determined, in some cases, based on an indication of associated services and corresponding QoS requirements from a higher layer. For example, SIM prioritization may be performed at the physical layer protocol level (e.g., by a modem at the UE), based on an indication from a higher layer protocol level (e.g., an application layer, PDCP layer, RLC layer, or MAC layer) that is above the physical layer protocol level.

At 310, the UE may determine a DSDA antenna switch diversity mode. In some cases, the diversity mode may be a full-concurrency mode or a transmit sharing mode. Full-concurrency DSDA provides that each SIM (e.g., a first SIM and a second SIM) has a resource allocation that provides at least one hardware power amplifier (PA) to each SIM, where the multiple PAs can be used concurrently at any given time instance. Transmit sharing DSDA provides that each SIM has a resource allocation with a shared hardware PA, where only one DSDA SIM at a time can make use of the shared PA at any given time instance.

At 315, the UE may determine to use transmit sharing based on available RF hardware for active DSDA RF band combinations. As discussed herein, transmit sharing at the UE may provide that communications for different SIMs share a same transmit PA and transmit antenna. In some cases, the determination to use transmit sharing may be based on particular RF components coupled with a modem at the UE that are capable of communications for particular RF bands that are to be used at each SIM.

At 320, the UE may determine transmit and primary receive (PRx) antenna allocation options (e.g., resource partitions) for the RF band combination. In some cases, multiple resource partitions may be identified that can be used for communications of both SIMs for the RF band combination. In some cases, one or more of the resource partitions may have a transmit and PRx antenna that is coupled for one or more of the SIMs (e.g., the transmit antenna is selected from available receive antennas based on a highest RSRP), and one or more of the resource partitions may have transmit and PRx antennas that are de-coupled for one or more of the SIMs (e.g., the transmit antenna for a SIM is not selected from available receive antennas for that SIM). For example, a first resource partition for a first SIM may have four receive antennas and operate in frequency band N1, and the second SIM may operate in frequency band N3 and have two receive antennas, and a second resource partition for the first SIM may have two receive antennas on N1 and the second SIM may have four receive antennas on N3, with both resource partitions having a shared transmit antenna.

At 325, the UE may allocate authority to the higher priority SIM to control RF resource partition selection with transmit sharing. In some cases, a resource partition with coupled transmit and PRx antennas may be selected for the higher priority SIM, and the lower priority SIM may be allocated with RF resources that use decoupled transmit and PRx antennas. In cases where a single SIM is allocated RF resources, the transmit and PRx antennas are coupled (e.g., either duplexed (FDD) or switched (TDD) to the same physical antenna), and in cases where DSDA is enabled it is possible (e.g., due to RF front-end limitations/constraints) that the transmit and PRx can be decoupled (e.g., not on same antenna). For ASDIV, the UE may select a transmit antennas based on measurements (e.g., both receive measurement, transmit measurements, or combinations thereof) on current and candidate antennas. If transmit and PRx antennas are decoupled, then the UE is not able to compare a current transmit antenna and other candidate antennas using receive/downlink measurements (e.g., RSRP or SNR types of measurements) for ASDIV transmit antenna evaluation purposes. In cases where multiple resource partitions are available, resources that have coupled transmit and PRx antennas may be selected for the higher priority SIM, and thus enhanced ASDIV antenna selection may be made for the higher priority communications.

Figure 4:
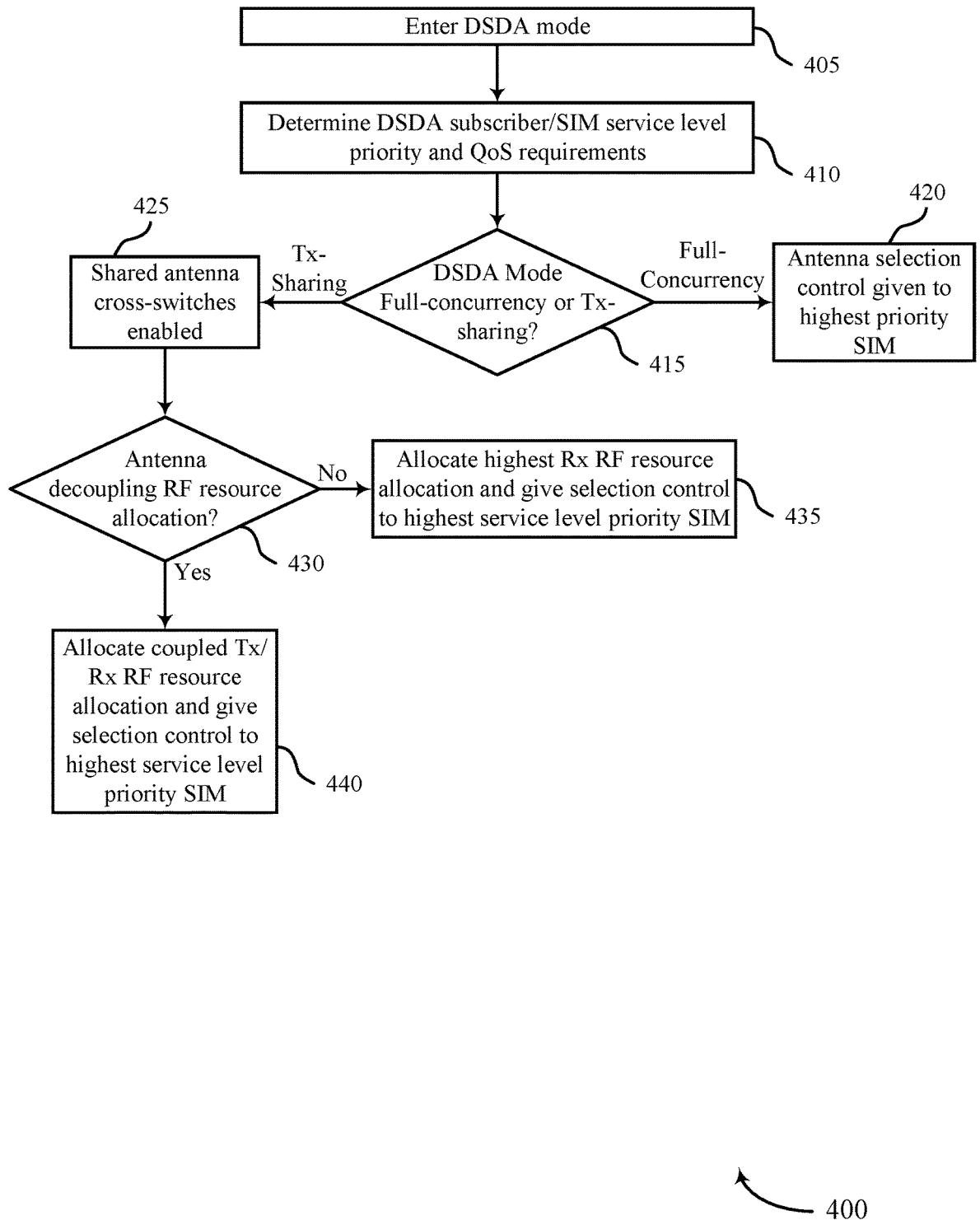
FIG. 4 shows another flow chart that illustrates a method that supports SIM prioritization techniques based on service priority and quality of service parameters in accordance with aspects of the present disclosure.

FIG. 4 illustrates an example of a flow chart that illustrates a method 400 that supports SIM prioritization techniques based on service priority and quality of service parameters in accordance with aspects of the present disclosure. The operations of the method 400 may be implemented by a UE or its components as described herein. For example, the operations of the method 400 may be performed by a UE 115 as described with reference to FIGS. 1 and 2, or may be performed by a modem, a chipset, and/or communications manager as discussed herein. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 4 may be performed in a different order than the example order shown, or the operations performed may be performed in different orders or at different times. Some operations may be combined or omitted and other operations may be added to the method 400.

In this example, at 405, the UE may enter DSDA mode. In some cases, DSDA mode may be entered, for a DSDA-capable UE, based on the UE being in connected mode on each SIM and calls being active for each SIM.

At 410, the UE may determine DSDA subscriber/SIM service level priority and QoS requirements for each SIM. In some cases, the service level priority and QoS requirements for each SIM may be based on one or more active services at the respective SIM, and an associated service level priority that is mapped to the active services. In some cases, service level priority information may be provided to a lower layer from a higher layer of a protocol stack at the UE, where resource partitions are identified and selected by the lower layer (e.g., at the PHY layer).

At 415, the UE may determine whether the DSDA mode is full-concurrency or transmit sharing. Such a determination may be made, for example, based on RF bands associated with the communications of each SIM and an amount of RF front end hardware that needs to be shared based on the RF band combinations. At 420, if it is determined that the DSDA mode if full-concurrency, antenna selection control may be granted to the highest priority SIM, with the other SIM given authority to select RF components after the selection is made by the higher priority SIM.

At 425, if it is determined that the DSDA mode is transmit sharing, the UE may enable the sharing of antenna cross-switch components in the RF front end. In some cases, a set of antennas may be coupled with a set of RF components in the RF front end via one or more cross-switch components, in order to couple a particular physical antenna element with one or more RF components (e.g., RF chain, PA, LNA, band select switched, etc.).

At 430, the UE may determine one or more resource partitions that can support DSDA communications, and may determine if an antenna decoupling RF resource allocation is present. At 435, if an antenna decoupling RF resource allocation is not present, the UE may allocate a highest receive RF resource allocation and give selection control to the highest service level priority SIM. The lower service level priority SIM may then select RF resources subsequent to the higher service level priority SIM. At 440, if an antenna decoupling RF resource allocation is present, the UE may allocate a coupled transmit/receive RF resource allocation and give selection control to the highest service level priority SIM. The lower service level priority SIM may then select RF resources subsequent to the higher service level priority SIM, where such resource may have decoupled transmit and PRx antennas.

Figure 5:
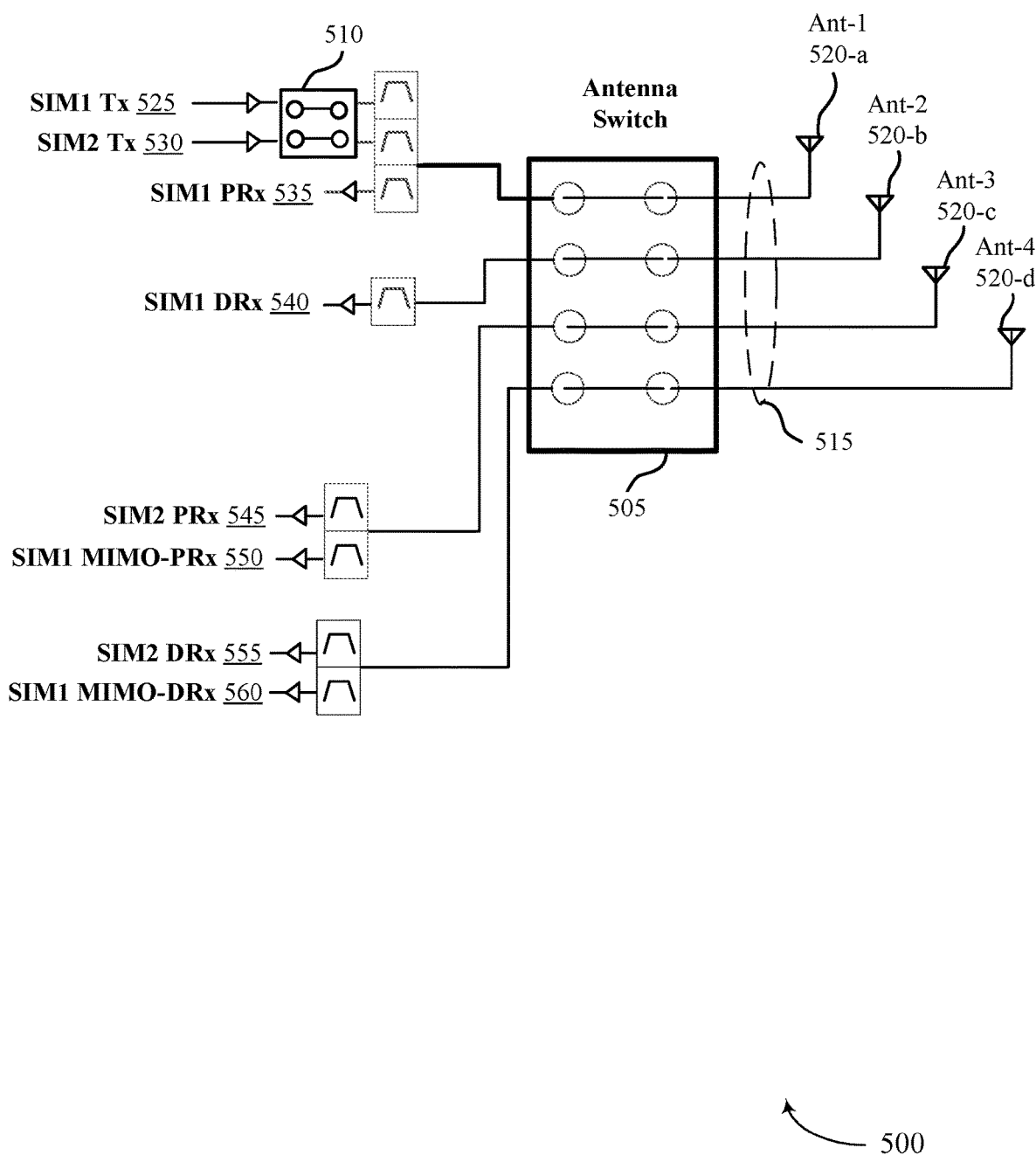
FIGS. 5 through 8 illustrate examples of antenna switching configurations that support SIM prioritization techniques based on service priority and quality of service parameters in accordance with aspects of the present disclosure.

FIG. 5 illustrates an example of an antenna switching configuration 500 that supports SIM prioritization techniques based on service priority and quality of service parameters in accordance with aspects of the present disclosure. In some examples, antenna switching configuration 500 may implement aspects of wireless communications system 100 or 200, as described with reference to FIGS. 1 and 2. In some examples, a set of antennas 520 may be used for communications, and may be an example of an antenna system 225 of FIG. 2. In some examples, components illustrated in FIG. 5 may be incorporated in a transmitting device or a receiving device (e.g., a UE or a base station), as described herein.

Broadly, FIG. 5 is a diagram illustrating example hardware components of a wireless device in accordance with aspects of the disclosure. The illustrated components may include those that may be used for antenna element selection where each antenna element may be switched to connect to an associated number of components based on uplink and downlink communications and associated antenna selections. Further, some components illustrated in FIG. 5 may be shared with one or more other antenna modules that may be included in a transmitting device or a receiving device. It is noted that there are numerous architectures for antenna elements and associated components, and techniques as discussed herein may be implemented in various different architectures. In some cases, the set of antennas 520 may be coupled with a modem at a UE, which may be capable of proving concurrent communications for multiple SIMs, including a first SIM (SIM1) and a second SIM (SIM2).

In this example, an antenna cross-switch 505 may couple the set of antennas 520 with various RF front-end components. Such RF front-end components may include, for example, one or more a digital to analog converters (DACs), one or more mixers, one or more splitters, one or more PAs, one or more LNAs, one or more phase shifters, or any combinations thereof. Transmission lines or other waveguides, wires, traces, or the like may connect various components and provide for transmission of signals between components.

In the example of FIG. 5, the device may use transmit sharing DSDA, where SIM1 transmissions 525 and SIM2 transmissions 530 may be switched at transmit switch 510 to be provided to a first antenna 520-a, which may be a shared transmit antenna among SIM1 and SIM2. In this example, communications for SIM1 may use four receive antennas 520, as indicated at 515. Further, communications for SIM2 may use two receive antennas, which in this example correspond to third antenna 520-c and fourth antenna 520-d. Thus, in the example of FIG. 5, first antenna 520-a may be used as a shared transmit antenna, and also be used for SIM1 PRx 535. Second antenna 520-b may be used for SIM1 diversity receive (DRx) 540. Third antenna 520-c may be used for SIM2 PRx 545, thus providing that PRx and transmit antennas for SIM2 are decoupled. Third antenna 520-c may also be used for SIM1 MIMO PRx 550. Fourth antenna 520-d may be used for SIM2 DRx 555, and may also be used for SIM1 MIMO DRx 560.

Such a RF resource allocation or partition may be based on SIM1 having a highest priority, and a most favorable transmit antenna among the set of antennas 520 may be selected for SIM1 communications. A resource partition that provides the most receive antennas to SIM1 may be selected in some cases, in order to provide measurements on each candidate antenna for selection of the transmit antenna. SIM2 may be reconfigured whenever SIM1 needs use of SIM2's antennas/antenna-ports, which may include SIM2 transmit/receive blanking in some cases where SIM1 uses the corresponding resources.

Figure 6:
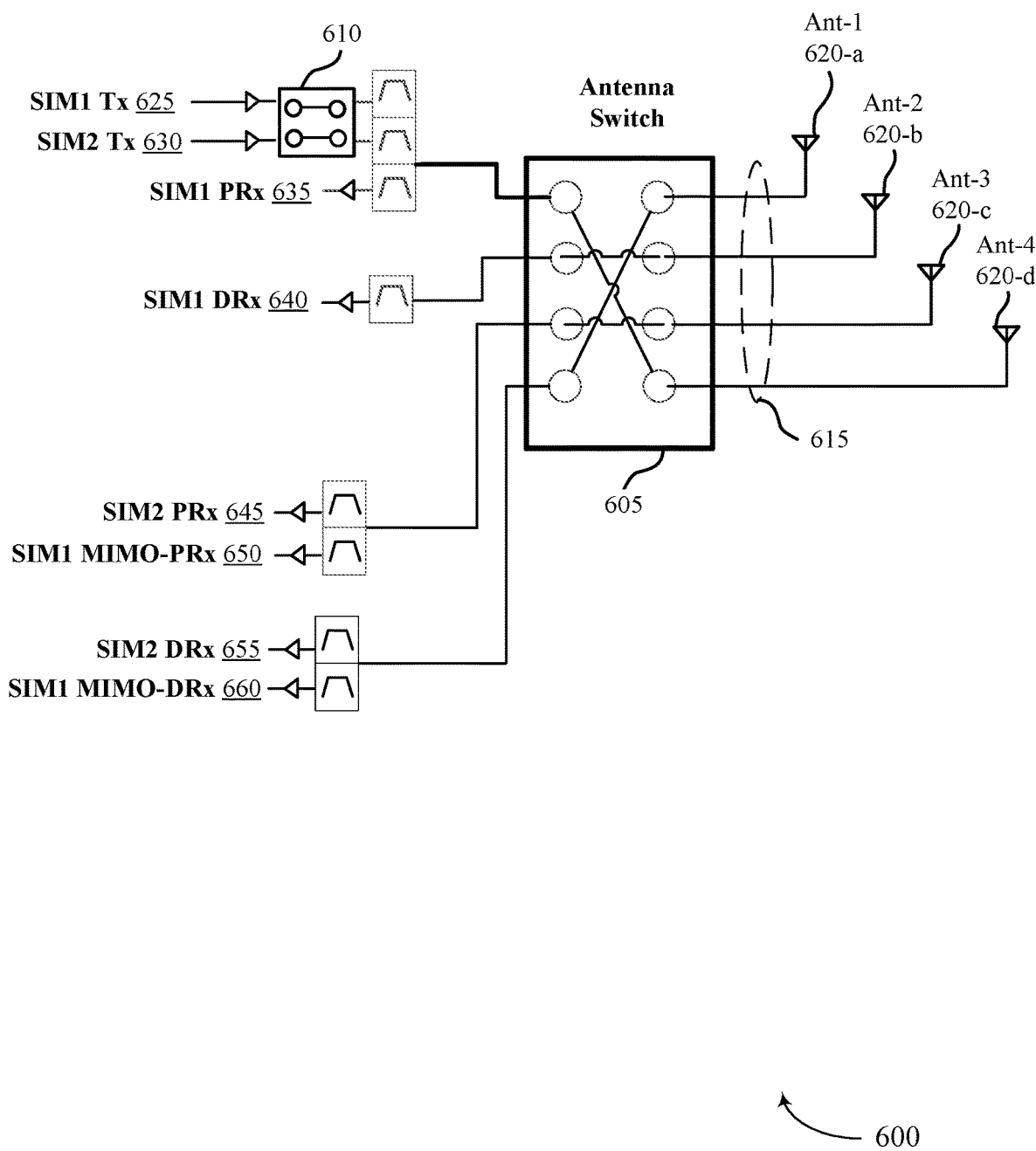

FIG. 6 illustrates an example of an antenna switching configuration 600 that supports SIM prioritization techniques based on service priority and quality of service parameters in accordance with aspects of the present disclosure. In some examples, antenna switching configuration 600 may implement aspects of wireless communications system 100 or 200, as described with reference to FIGS. 1 and 2. In some examples, a set of antennas 620 may be used for communications, and may be an example of an antenna system 225 of FIG. 2. In some examples, similarly as the example of FIG. 5, components illustrated in FIG. 6 may be incorporated in a transmitting device or a receiving device (e.g., a UE or a base station), as described herein. The illustrated components may include those that may be used for antenna element selection where each antenna element may be switched to connect to an associated number of components based on uplink and downlink communications and associated antenna selections. In some cases, the set of antennas 620 may be coupled with a modem at a UE, which may be capable of proving concurrent communications for multiple SIMs, including a first SIM (SIM1) and a second SIM (SIM2).

In this example, an antenna cross-switch 605 may couple the set of antennas 620 with various RF front-end components (e.g., DACs, mixers, splitters, PAs, LNAs, phase shifters, etc.). In the example of FIG. 6, the device may use transmit sharing DSDA, and it may be determined that SIM1 has a higher transmit priority than SIM2 and may be allocated with RF resources that include four antennas 615 of the set of antennas 620. In this example, it may be determined that the fourth antenna 620-d has preferable conditions to be used as a transmit antenna (e.g., based on RSRP or SNR type measurements). When using transmit sharing, SIM1 transmissions 625 and SIM2 transmissions 630 may be switched at transmit switch 610 to be provided to the fourth antenna 620-d, based on the selection of the fourth antenna 620-d for transmissions associated with higher priority SIM1. Communications for SIM2 may use two receive antennas, which in this example correspond to first antenna 620-a and third antenna 620-c.

Thus, in the example of FIG. 6, fourth antenna 620-d may be used as a shared transmit antenna for SIM1 transmissions 625 and SIM2 transmissions 630, and also be used for SIM1 PRx 635. Second antenna 620-b may be used for SIM1 DRx 640. Third antenna 620-c may be used for SIM2 PRx 645, thus providing that PRx and transmit antennas for SIM2 are decoupled. Third antenna 620-c may also be used for SIM1 MIMO PRx 650. First antenna 620-a may be used for SIM2 DRx 655, and may also be used for SIM1 MIMO DRx 660. While the examples of FIGS. 5 and 6 illustrate SIM1 having higher priority communications and having a resource allocation with four antennas, such techniques may also be applied in cases where SIM2 has higher priority, in which cases the above examples may simply switch SIM1 and SIM2.

Figure 7:
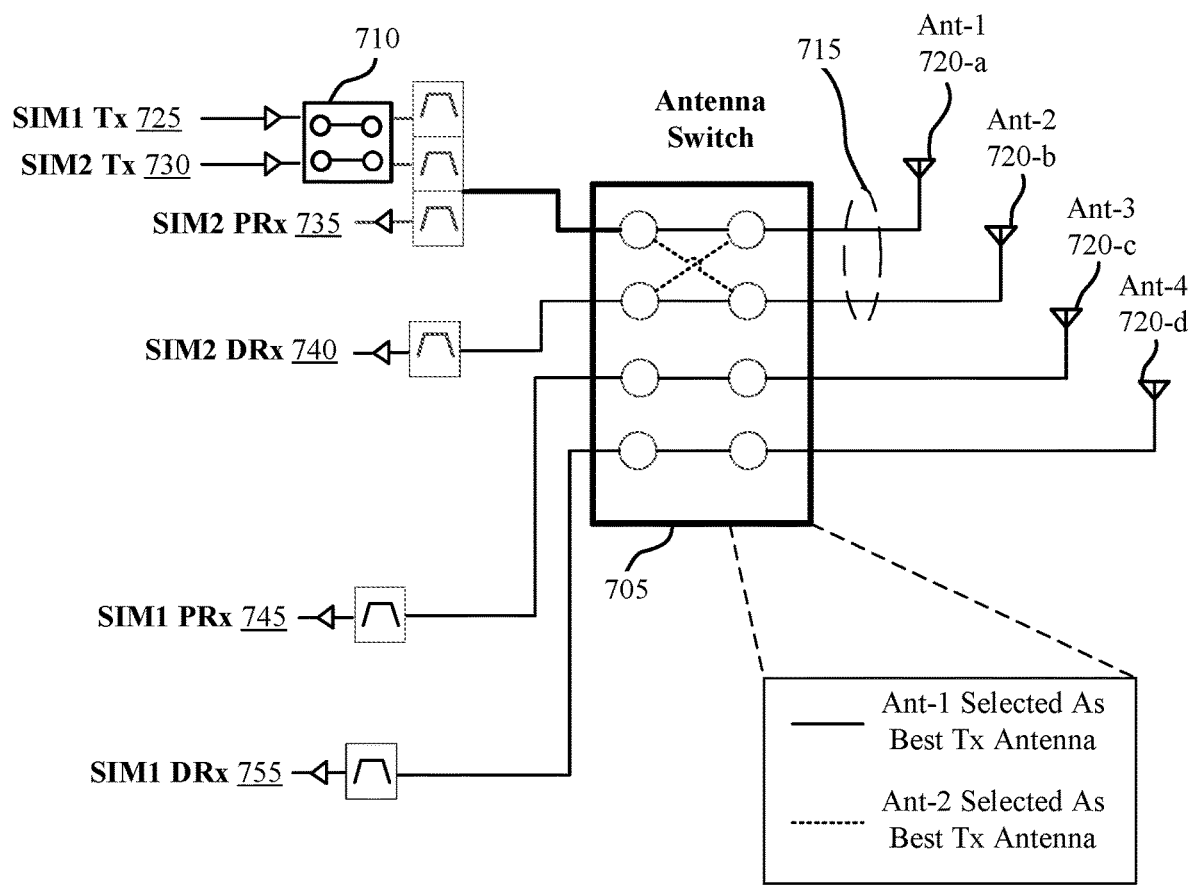

FIG. 7 illustrates an example of an antenna switching configuration 700 that supports SIM prioritization techniques based on service priority and quality of service parameters in accordance with aspects of the present disclosure. In some examples, antenna switching configuration 700 may implement aspects of wireless communications system 100 or 200, as described with reference to FIGS. 1 and 2. In some examples, a set of antennas 720 may be used for communications, and may be an example of an antenna system 225 of FIG. 2. In some examples, similarly as the example of FIGS. 5-6, components illustrated in FIG. 7 may be incorporated in a transmitting device or a receiving device (e.g., a UE or a base station), as described herein. The illustrated components may include those that may be used for antenna element selection where each antenna element may be switched to connect to an associated number of components based on uplink and downlink communications and associated antenna selections. In some cases, the set of antennas 720 may be coupled with a modem at a UE, which may be capable of proving concurrent communications for multiple SIMs, including a first SIM (SIM1) and a second SIM (SIM2).

In this example, an antenna cross-switch 705 may couple the set of antennas 720 with various RF front-end components (e.g., DACs, mixers, splitters, PAs, LNAs, phase shifters, etc.). In the example of FIG. 7, the device may use transmit sharing DSDA, and it may be determined that SIM2 has a higher transmit priority than SIM1 and may be allocated with RF resources that include two antennas 715 of the set of antennas 720. In a first example, it may be determined that the first antenna 720-a has preferable conditions to be used as a transmit antenna (e.g., based on RSRP or SNR type measurements). In a second example, illustrated by the broken lines in antenna cross-switch 705, it may be determined that the second antenna 720-b has preferable conditions to be used as a transmit antenna, in which case the antenna cross-switch 705 may be configured to switch the connections of the first antenna 720-a and the second antenna 720-b.

In the first example, when using transmit sharing, SIM2 transmissions 725 and SIM1 transmissions 730 may be switched at transmit switch 710 to be provided to the first antenna 720-a, based on the selection of the first antenna 720-a for transmissions associated with higher priority SIM2. Likewise, in the second example, SIM2 transmissions 725 and SIM1 transmissions 730 may be switched at transmit switch 710 to be provided to the second antenna 720-b, based on the selection of the second antenna 720-b for transmissions associated with higher priority SIM2. Communications for SIM1 may use two receive antennas, which in this example correspond to third antenna 720-c and fourth antenna 720-d.

Thus, in the first example, first antenna 720-a may be used as a shared transmit antenna for SIM2 transmissions 725 and SIM1 transmissions 730, and also be used for SIM2 PRx 735, and second antenna 720-b may be used for SIM2 DRx 740. In the second example, the roles of the first antenna 720-a and second antenna 720-b are reversed, based on being switched at antenna cross-switch 705. In both the first example and the second example, the third antenna 720-c may be used for SIM1 PRx 745, thus providing that PRx and transmit antennas for SIM1 are decoupled. Fourth antenna 720-d may be used for SIM1 DRx 755.

Figure 8:
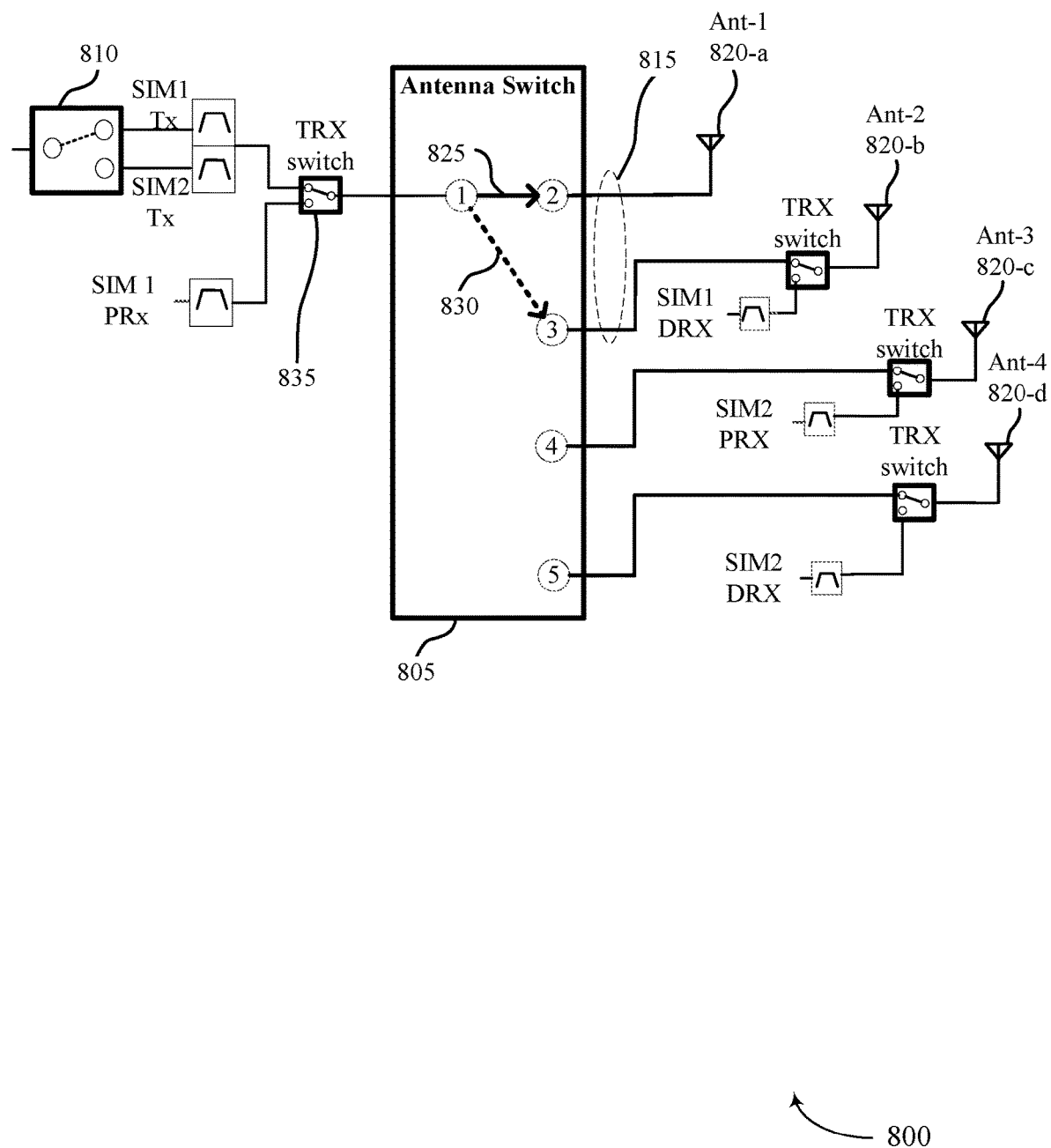

FIG. 8 illustrates an example of an antenna switching configuration 800 that supports SIM prioritization techniques based on service priority and quality of service parameters in accordance with aspects of the present disclosure. In some examples, antenna switching configuration 800 may implement aspects of wireless communications system 100 or 200, as described with reference to FIGS. 1 and 2. In some examples, a set of antennas 820 may be used for communications, and may be an example of an antenna system 225 of FIG. 2. In some examples, similarly as the example of FIGS. 5-7, components illustrated in FIG. 8 may be incorporated in a transmitting device or a receiving device (e.g., a UE or a base station), as described herein. The illustrated components may include those that may be used for antenna element selection where each antenna element may be switched to connect to an associated number of components based on uplink and downlink communications and associated antenna selections. In some cases, the set of antennas 820 may be coupled with a modem at a UE, which may be capable of proving concurrent communications for multiple SIMs, including a first SIM (SIM1) and a second SIM (SIM2).

In this example, a TDD-type antenna sharing may be implemented, in which transmit/receive switches may be implemented between antennas 820 and the antenna cross-switch 805. In this example, a resource allocation may provide SIM1 with a subset 815 of two receive antennas 820 that include first antenna 820-a and second antenna 820-b. SIM1 may have a highest priority and can thus select a transmit antenna among subset 815 (e.g., an antenna having a highest RSRP or SNR). SIM2 in this example may have RF front-end hardware paths that support only two receive antennas (e.g., third antenna 820-c and fourth antenna 820-d, while the SIM2 transmit path is shared with SIM1 through transmit switch 810. Since SIM1 has higher priority, SIM1 controls the transmit antenna selection among the subset 815 of antennas, and SIM2 will have decoupled transmit and receive antennas. For example, antenna cross-switch 805 may have a first configuration 825 that couples the transmit/receive switch 835 and the first antenna 820-a, and a second configuration 830 that couples the transmit/receive switch 835 and the second antenna 820-b. The transmit/receive switch 835 also switches, in a TDD manner, between the SIM1 or SIM2 transmission at switch 810 and SIM1 PRx. The second antenna 820-b, third antenna 820-c, and fourth antenna 820-d in this example each have an associated transmit/receive switch to provide TDD antenna sharing between transmit and receive, if needed. In the example of FIG. 8, SIM1 DRx, SIM2 PRx, and SIM2 DRx may be provided as illustrated from the respective transmit-receive switches.

Figure 9:
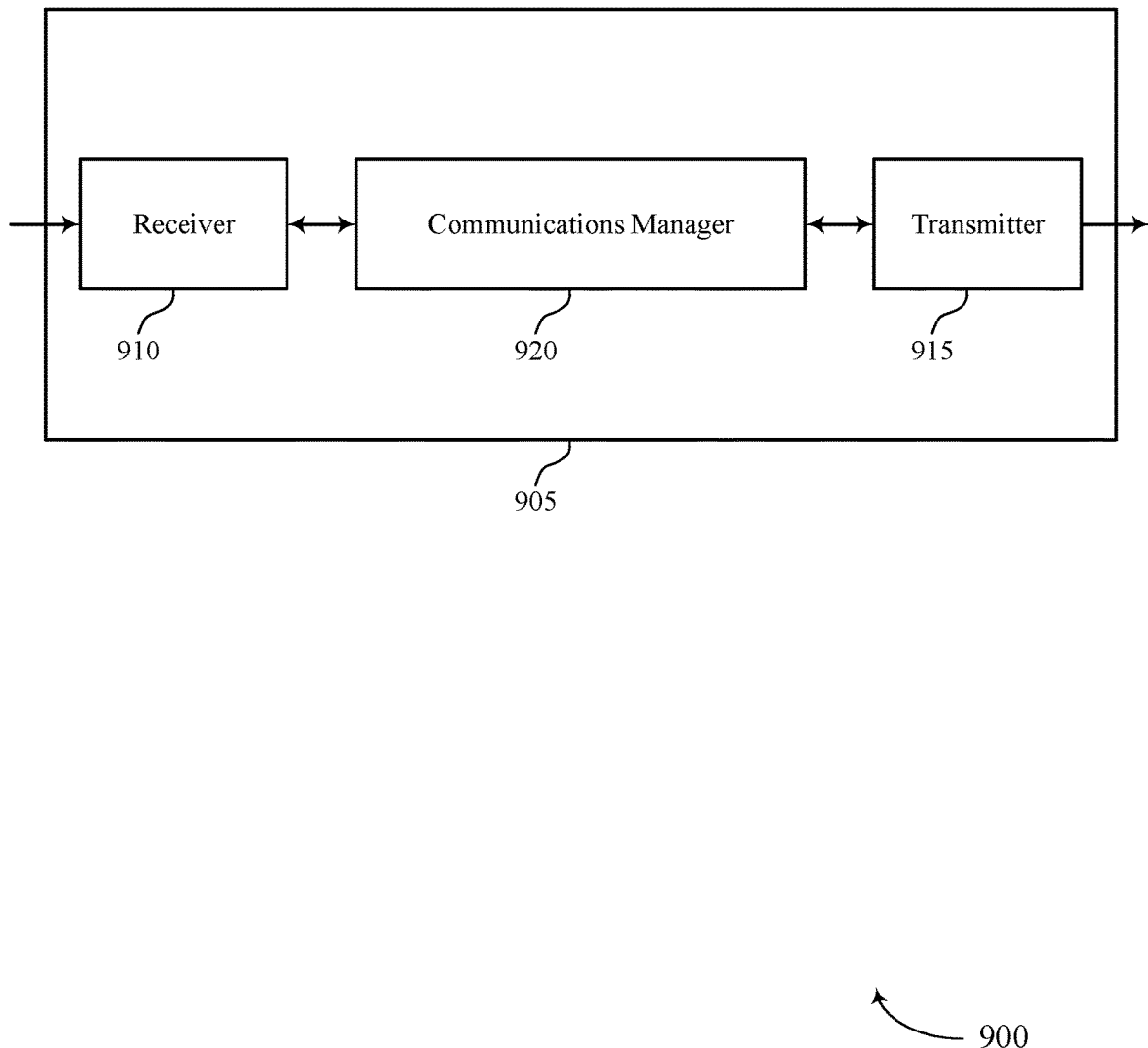
FIGS. 9 and 10 show block diagrams of devices that support SIM prioritization techniques based on service priority and quality of service parameters in accordance with aspects of the present disclosure.

FIG. 9 shows a block diagram 900 of a device 905 that supports SIM prioritization techniques based on service priority and quality of service parameters in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to SIM prioritization techniques based on service priority and quality of service parameters). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to SIM prioritization techniques based on service priority and quality of service parameters). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of SIM prioritization techniques based on service priority and quality of service parameters as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication in accordance with examples as disclosed herein. For example, the communications manager 920 may be configured as or otherwise support a means for identifying a set of available resources for communications at the UE that include at least one radio frequency component, the at least one radio frequency component is shared between a first SIM and a second SIM. The communications manager 920 may be configured as or otherwise support a means for identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The communications manager 920 may be configured as or otherwise support a means for receiving a first set of quality of service parameters and a first service level priority associated with the first SIM, and a second set of quality of service parameters and a second service level priority associated with the second SIM, the first service level priority having a higher priority than the second service level priority. The communications manager 920 may be configured as or otherwise support a means for selecting one of the first resource partition or the second resource partition for communications based on the first service level priority and which of the first resource partition or the second resource partition provides resources to satisfy the first set of quality of service parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for efficient antenna and RF component management for UEs operation using DSDA. Providing control for the selection of RF resources and antennas based on a SIM having a higher priority may allow for a UE to maintain QoS targets for the higher priority communications, and allow for contemporaneous communications of a different SIM with lower priority communications. Such techniques may thus enhance UE efficiency, increase data rates, and provide for enhanced user experience.

Figure 10:
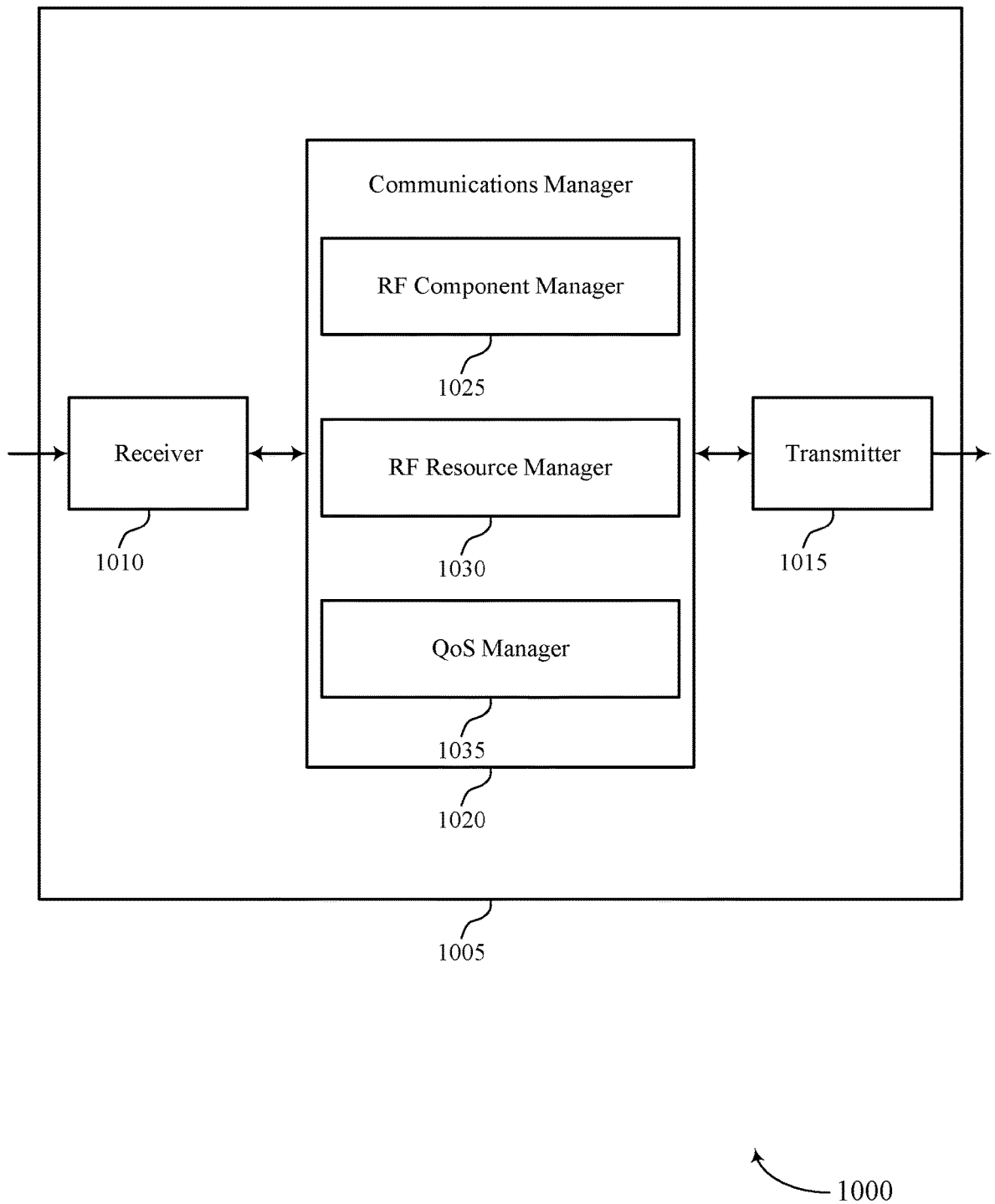

FIG. 10 shows a block diagram 1000 of a device 1005 that supports SIM prioritization techniques based on service priority and quality of service parameters in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to SIM prioritization techniques based on service priority and quality of service parameters). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SIM prioritization techniques based on service priority and quality of service parameters). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of SIM prioritization techniques based on service priority and quality of service parameters as described herein. For example, the communications manager 1020 may include an RF component manager 1025, an RF resource manager 1030, a QoS manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. The RF component manager 1025 may be configured as or otherwise support a means for identifying a set of available resources for communications at the UE that include at least one radio frequency component, the at least one radio frequency component is shared between a first SIM and a second SIM. The RF resource manager 1030 may be configured as or otherwise support a means for identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The QoS manager 1035 may be configured as or otherwise support a means for receiving a first set of quality of service parameters and a first service level priority associated with the first SIM, and a second set of quality of service parameters and a second service level priority associated with the second SIM, the first service level priority having a higher priority than the second service level priority. The RF resource manager 1030 may be configured as or otherwise support a means for selecting one of the first resource partition or the second resource partition for communications based on the first service level priority and which of the first resource partition or the second resource partition provides resources to satisfy the first set of quality of service parameters.

Figure 11:
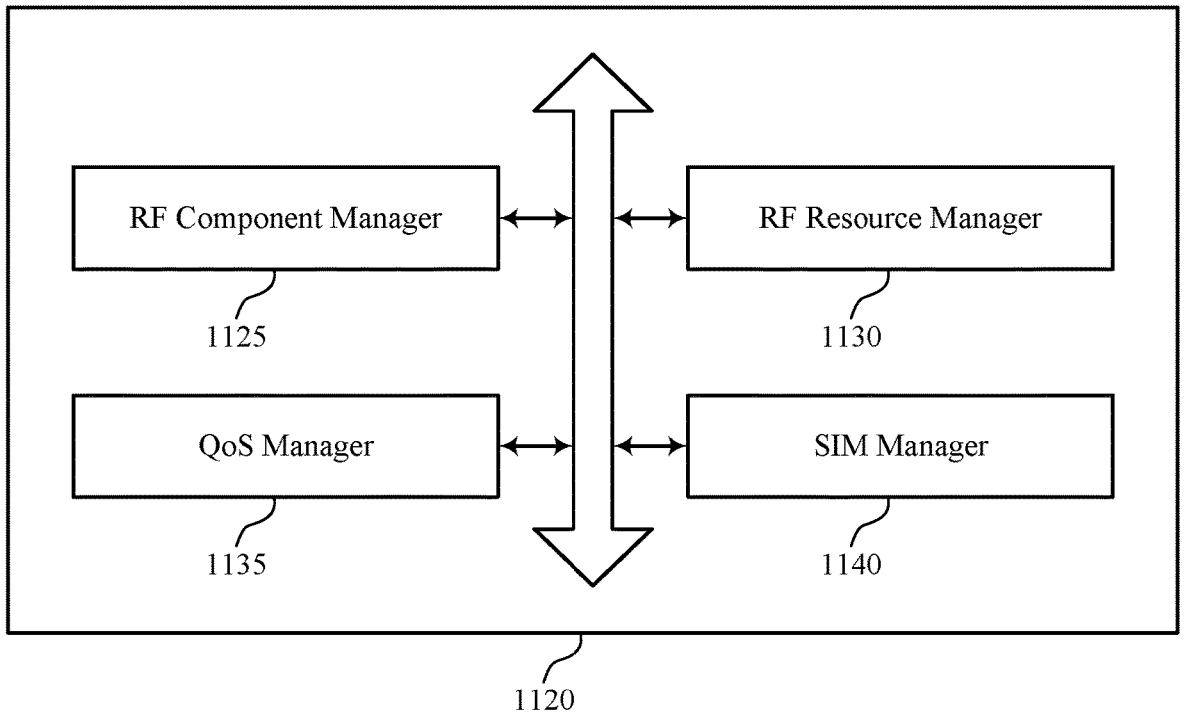
FIG. 11 shows a block diagram of a communications manager that supports SIM prioritization techniques based on service priority and quality of service parameters in accordance with aspects of the present disclosure.

FIG. 11 shows a block diagram 1100 of a communications manager 1120 that supports SIM prioritization techniques based on service priority and quality of service parameters in accordance with aspects of the present disclosure. The communications manager 1120 may be an example of aspects of a communications manager 920, a communications manager 1020, or both, as described herein. The communications manager 1120, or various components thereof, may be an example of means for performing various aspects of SIM prioritization techniques based on service priority and quality of service parameters as described herein. For example, the communications manager 1120 may include an RF component manager 1125, an RF resource manager 1130, a QoS manager 1135, an SIM manager 1140, or any combination thereof. Each of these components may communicate, directly or indirectly, with one another (e.g., via one or more buses).

The communications manager 1120 may support wireless communication in accordance with examples as disclosed herein. The RF component manager 1125 may be configured as or otherwise support a means for identifying a set of available resources for communications at the UE that include at least one radio frequency component, the at least one radio frequency component is shared between a first SIM and a second SIM. The RF resource manager 1130 may be configured as or otherwise support a means for identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The QoS manager 1135 may be configured as or otherwise support a means for receiving a first set of quality of service parameters and a first service level priority associated with the first SIM, and a second set of quality of service parameters and a second service level priority associated with the second SIM, the first service level priority having a higher priority than the second service level priority. In some examples, the RF resource manager 1130 may be configured as or otherwise support a means for selecting one of the first resource partition or the second resource partition for communications based on the first service level priority and which of the first resource partition or the second resource partition provides resources to satisfy the first set of quality of service parameters.

In some examples, to support selecting, the RF resource manager 1130 may be configured as or otherwise support a means for determining that the first resource partition provides antenna switching diversity sufficient to meet the first set of quality of service (QoS) parameters. In some examples, to support selecting, the RF resource manager 1130 may be configured as or otherwise support a means for selecting the first resource partition for the contemporaneous communications of both the first SIM and the second SIM based on the determining.

In some examples, the SIM manager 1140 may be configured as or otherwise support a means for assigning a first subset of receive radio frequency components associated with the first resource partition to the first SIM, the first subset of receive radio frequency components including a first number of receive antennas. In some examples, the RF resource manager 1130 may be configured as or otherwise support a means for selecting a second number of transmit antennas based on one or more measurements at each of the receive antennas. In some examples, the RF resource manager 1130 may be configured as or otherwise support a means for assigning a remaining number of transmit antennas of the set of available resources to the second resource partition for the second SIM.

In some examples, the SIM manager 1140 may be configured as or otherwise support a means for granting authority to a controller associated with the first SIM to select the first subset of receive radio frequency components and the second number of transmit antennas. In some examples, the SIM manager 1140 may be configured as or otherwise support a means for providing the controller associated with the first SIM control over one or more radio frequency components including one or more band select switches, antenna switch control, power amplifier control, or any combinations thereof.

In some examples, the radio frequency components that are shared among a first SIM and the second SIM include one or more transmit chains, one or more transmit power amplifiers, one or more receive chains, one or more receive low noise amplifiers, one or more antenna switches, one or more antennas, one or more band select switches, or any combinations thereof.

In some examples, to support selection of resources, the RF resource manager 1130 may be configured as or otherwise support a means for determining that the first resource partition provides a highest capability for transmit antenna selection based on the first QoS parameters. In some examples, the RF resource manager 1130 may be configured as or otherwise support a means for selecting the first resource partition for the contemporaneous communications of both the first SIM and the second SIM based on the determining.

In some examples, the first service level priority and the second service level priority are determined based on a service level priority order. In some examples, the first service level priority and the second service level priority are further determined based on a mapping between an application associated with communications of each SIM and an associated priority of the application in the service level priority order. In some examples, the first service level priority and the second service level priority are determined at a higher layer protocol level that is above a physical layer protocol level that assigns resource partitions.

In some examples, the contemporaneous communications of both the first SIM and the second SIM are full-concurrency communications and each of the first resource partition and the second resource partition include at least one power amplifier for concurrent transmissions of both the first SIM and the second SIM at any given time instance. In some examples, the first resource partition and the second resource partition are determined based on whether the contemporaneous communications use a transmit-sharing DSDA configuration or a full-concurrency DSDA configuration.

In some examples, the first SIM is allocated resources of the set of available resources in which transmit and receive components are coupled for transmit-sharing DSDA, based on the first service level priority associated with the first SIM. In some examples, at least a first transmit component is shared by both the first SIM and the second SIM, and the second SIM suspends communications when the first SIM uses the first transmit component, based on the second service level priority associated with the second SIM. In some examples, the second SIM is allocated resources of the set of available resources in which one or more transmit and receive components are decoupled for transmit-sharing DSDA.

In some examples, the RF resource manager 1130 may be configured as or otherwise support a means for allocating a first antenna of a set of multiple antennas as a first transmit antenna for the first SIM, the first antenna having a highest channel measurement of the set of multiple antennas, and the first antenna being shared with the second SIM for receiving communications of the second SIM. In some examples, the RF resource manager 1130 may be configured as or otherwise support a means for allocating a second antenna of the set of multiple antennas to the second SIM as a second transmit antenna, to provide decoupled transmit and receive antennas for the second SIM.

Figure 12:
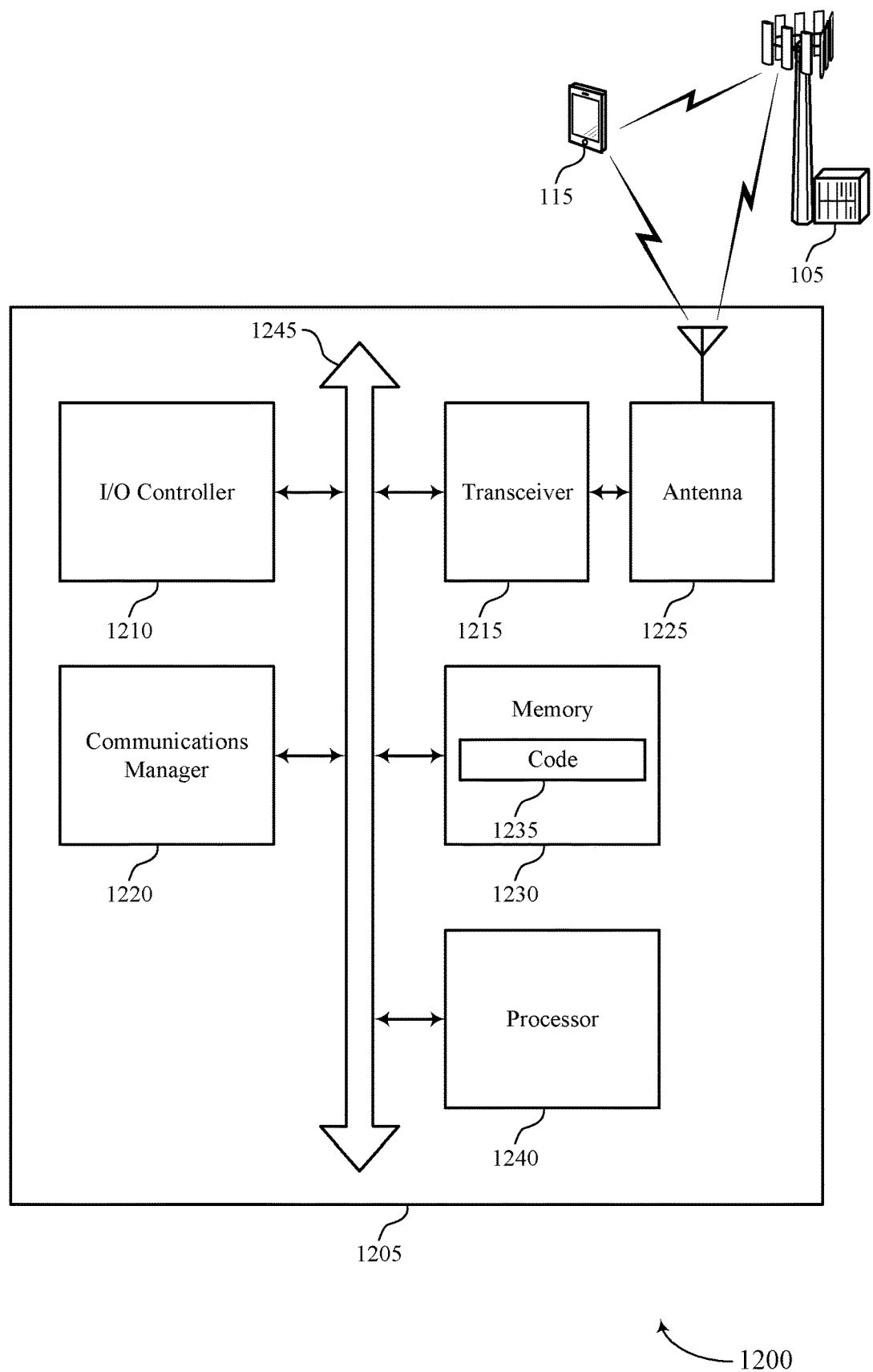
FIG. 12 shows a diagram of a system including a device that supports SIM prioritization techniques based on service priority and quality of service parameters in accordance with aspects of the present disclosure.

FIG. 12 shows a diagram of a system 1200 including a device 1205 that supports SIM prioritization techniques based on service priority and quality of service parameters in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor

1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting SIM prioritization techniques based on service priority and quality of service parameters). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication in accordance with examples as disclosed herein. For example, the communications manager 1220 may be configured as or otherwise support a means for identifying a set of available resources for communications at the UE that include at least one radio frequency component, the at least one radio frequency component is shared between a first SIM and a second SIM. The communications manager 1220 may be configured as or otherwise support a means for identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The communications manager 1220 may be configured as or otherwise support a means for receiving a first set of quality of service parameters and a first service level priority associated with the first SIM, and a second set of quality of service parameters and a second service level priority associated with the second SIM, the first service level priority having a higher priority than the second service level priority. The communications manager 1220 may be configured as or otherwise support a means for selecting one of the first resource partition or the second resource partition for communications based on the first service level priority and which of the first resource partition or the second resource partition provides resources to satisfy the first set of quality of service parameters.

By including or configuring the communications manager 1220 in accordance with examples as described herein, the device 1205 may support techniques for efficient antenna and RF component management for UEs operation using DSDA. Providing control for the selection of RF resources and antennas based on a SIM having a higher priority may allow for a UE to maintain QoS targets for the higher priority communications, and allow for contemporaneous communications of a different SIM with lower priority communications. Such techniques may thus enhance UE efficiency, increase data rates, and provide for enhanced user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of SIM prioritization techniques based on service priority and quality of service parameters as described herein, or the processor 1240 and the memory 1230 may be otherwise configured to perform or support such operations.

Figure 13:
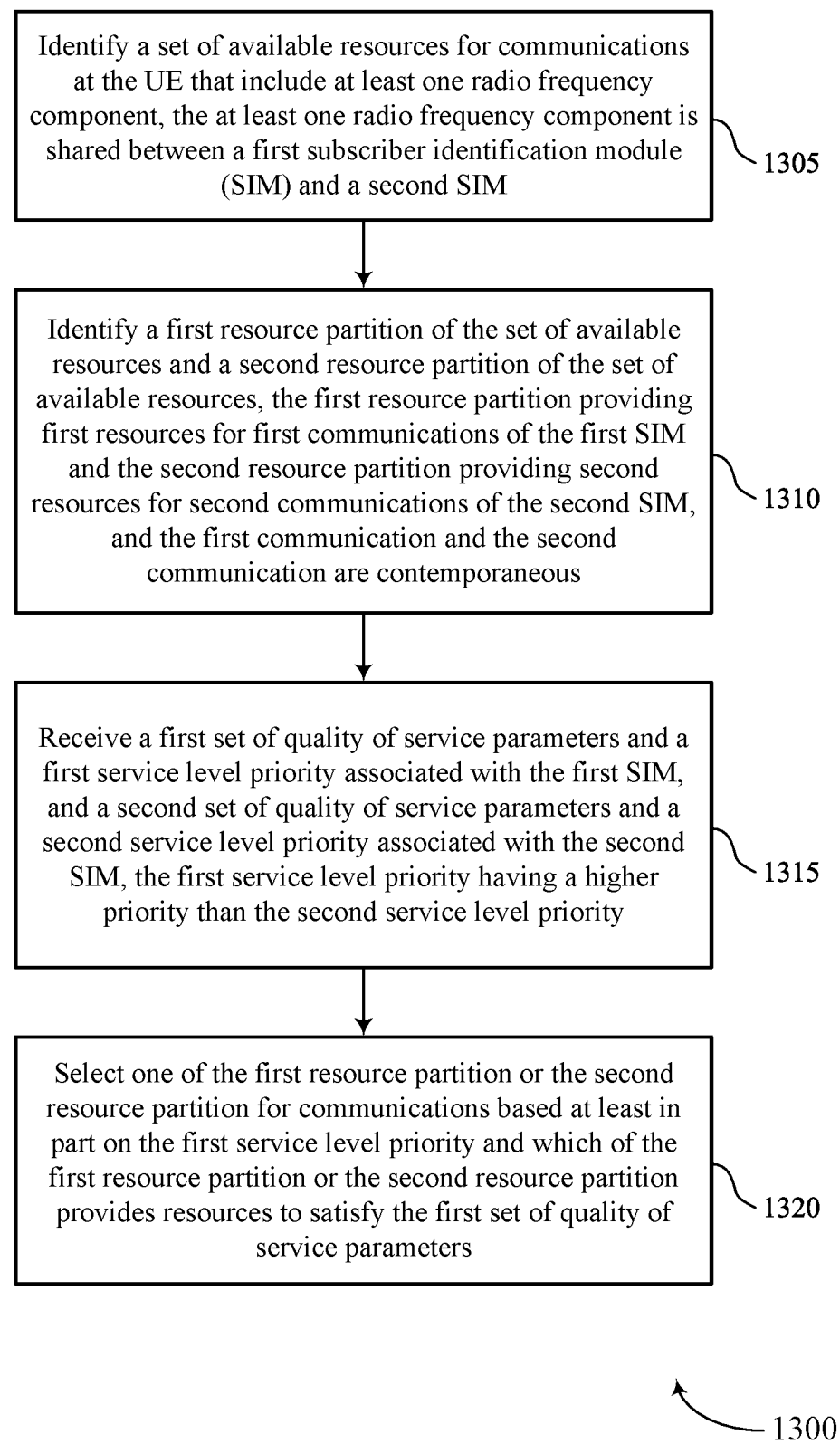
FIGS. 13 through 16 show flowcharts illustrating methods that support SIM prioritization techniques based on service priority and quality of service parameters in accordance with aspects of the present disclosure.

FIG. 13 shows a flowchart illustrating a method 1300 that supports SIM prioritization techniques based on service priority and quality of service parameters in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1305, the method may include identifying a set of available resources for communications at the UE that include at least one radio frequency component, the at least one radio frequency component is shared between a first SIM and a second SIM. The operations of 1305 may be performed in accordance with examples as disclosed herein. In some examples, aspects of the operations of 1305 may be performed by an RF component manager 1125 as described with reference to FIG. 11.

At 1310, the method may include identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The operations of 1310 may be performed in accordance with examples as disclosed herein. In some examples, aspects of the operations of 1310 may be performed by an RF resource manager 1130 as described with reference to FIG. 11.

At 1315, the method may include receiving a first set of quality of service parameters and a first service level priority associated with the first SIM, and a second set of quality of service parameters and a second service level priority associated with the second SIM, the first service level priority having a higher priority than the second service level priority. The operations of 1315 may be performed in accordance with examples as disclosed herein. In some examples, aspects of the operations of 1315 may be performed by a QoS manager 1135 as described with reference to FIG. 11.

At 1320, the method may include selecting one of the first resource partition or the second resource partition for communications based on the first service level priority and which of the first resource partition or the second resource partition provides resources to satisfy the first set of quality of service parameters. The operations of 1320 may be performed in accordance with examples as disclosed herein. In some examples, aspects of the operations of 1320 may be performed by an RF resource manager 1130 as described with reference to FIG. 11.

Figure 14:
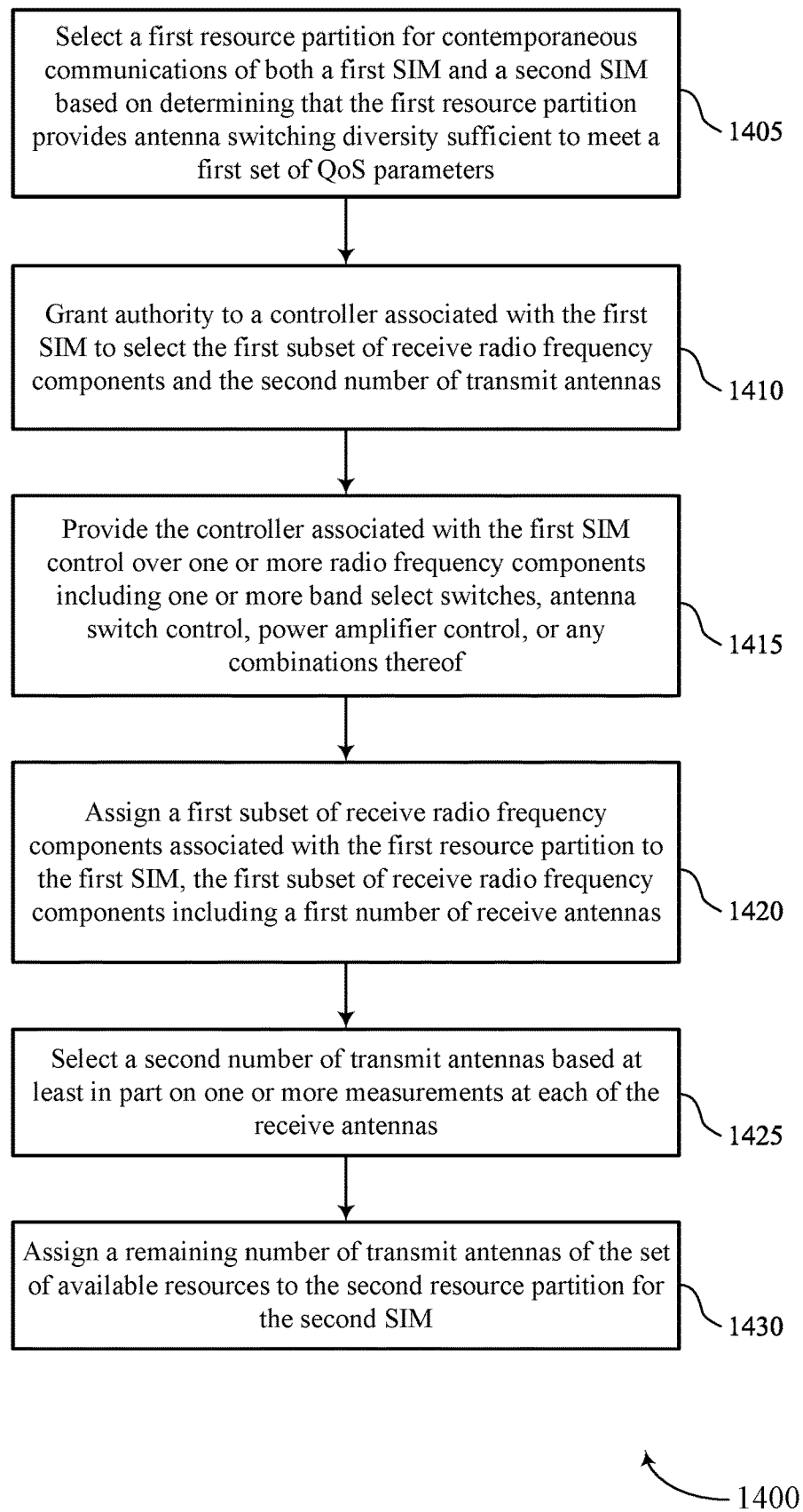

FIG. 14 shows a flowchart illustrating a method 1400 that supports SIM prioritization techniques based on service priority and quality of service parameters in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1405, the method may include selecting a first resource partition for contemporaneous communications of both a first SIM and a second SIM based on determining that the first resource partition provides antenna switching diversity sufficient to meet a first set of QoS parameters. The operations of 1405 may be performed in accordance with examples as disclosed herein. In some examples, aspects of the operations of 1405 may be performed by an RF resource manager 1130 as described with reference to FIG. 11.

At 1410, the method may include granting authority to a controller associated with the first SIM to select the first subset of receive radio frequency components and the second number of transmit antennas. The operations of 1410 may be performed in accordance with examples as disclosed herein. In some examples, aspects of the operations of 1410 may be performed by an SIM manager 1140 as described with reference to FIG. 11.

At 1415, the method may include providing the controller associated with the first SIM control over one or more radio frequency components including one or more band select switches, antenna switch control, power amplifier control, or any combinations thereof. The operations of 1415 may be performed in accordance with examples as disclosed herein. In some examples, aspects of the operations of 1415 may be performed by an SIM manager 1140 as described with reference to FIG. 11.

At 1420, the method may include assigning a first subset of receive radio frequency components associated with the first resource partition to the first SIM, the first subset of receive radio frequency components including a first number of receive antennas. The operations of 1420 may be performed in accordance with examples as disclosed herein. In some examples, aspects of the operations of 1420 may be performed by an SIM manager 1140 as described with reference to FIG. 11.

At 1425, the method may include selecting a second number of transmit antennas based on one or more measurements at each of the receive antennas. The operations of 1425 may be performed in accordance with examples as disclosed herein. In some examples, aspects of the operations of 1425 may be performed by an RF resource manager 1130 as described with reference to FIG. 11.

At 1430, the method may include assigning a remaining number of transmit antennas of the set of available resources to the second resource partition for the second SIM. The operations of 1430 may be performed in accordance with examples as disclosed herein. In some examples, aspects of the operations of 1430 may be performed by an RF resource manager 1130 as described with reference to FIG. 11.

Figure 15:
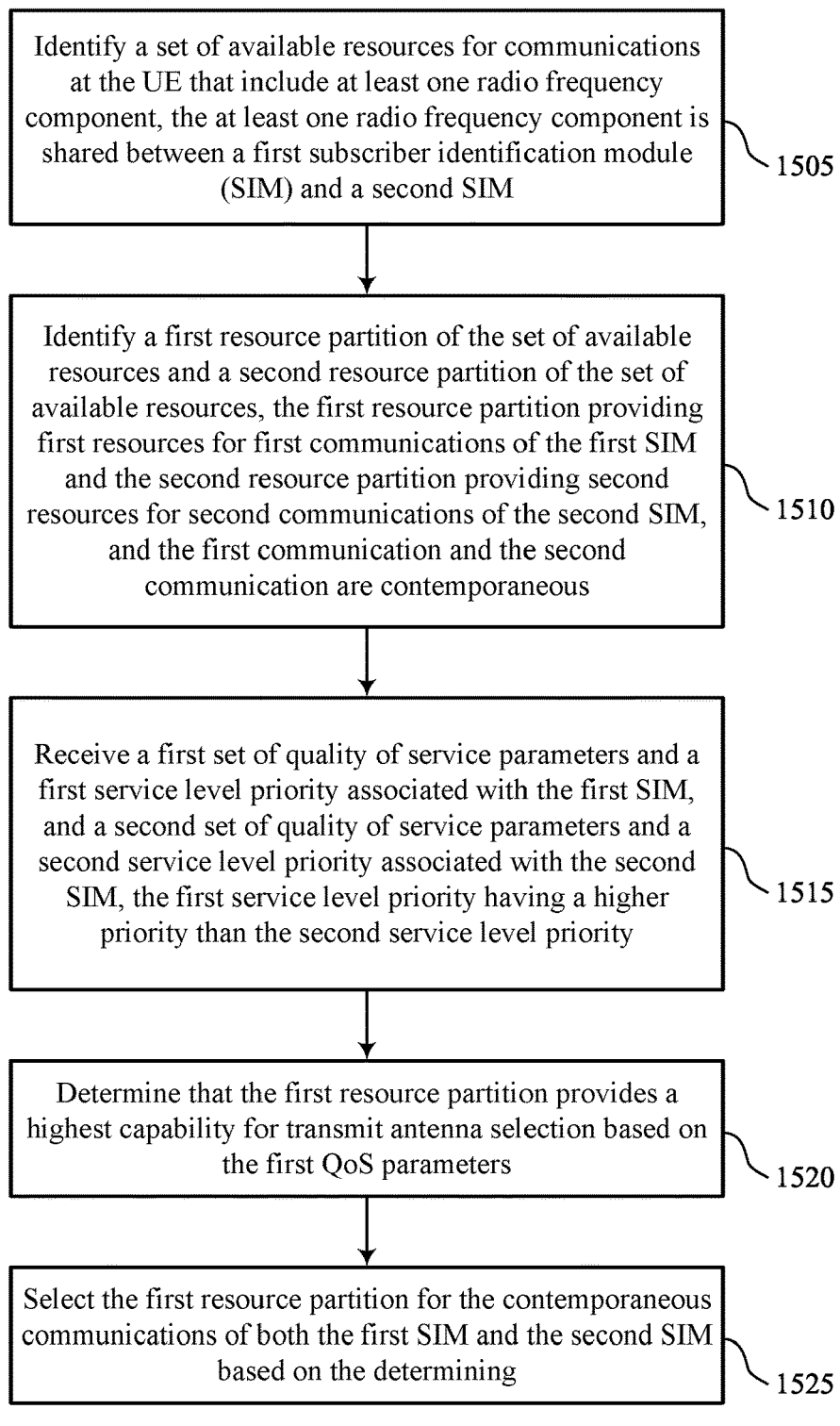

FIG. 15 shows a flowchart illustrating a method 1500 that supports SIM prioritization techniques based on service priority and quality of service parameters in accordance with aspects of the present disclosure. The operations of the method 1500 may be implemented by a UE or its components as described herein. For example, the operations of the method 1500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1505, the method may include identifying a set of available resources for communications at the UE that include at least one radio frequency component, the at least one radio frequency component is shared between a first SIM and a second SIM. The operations of 1505 may be performed in accordance with examples as disclosed herein.

In some examples, aspects of the operations of 1505 may be performed by an RF component manager 1125 as described with reference to FIG. 11.

At 1510, the method may include identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The operations of 1510 may be performed in accordance with examples as disclosed herein. In some examples, aspects of the operations of 1510 may be performed by an RF resource manager 1130 as described with reference to FIG. 11.

At 1515, the method may include receiving a first set of quality of service parameters and a first service level priority associated with the first SIM, and a second set of quality of service parameters and a second service level priority associated with the second SIM, the first service level priority having a higher priority than the second service level priority. The operations of 1515 may be performed in accordance with examples as disclosed herein. In some examples, aspects of the operations of 1515 may be performed by a QoS manager 1135 as described with reference to FIG. 11.

At 1520, the method may include determining that the first resource partition provides a highest capability for transmit antenna selection based on the first QoS parameters. The operations of 1520 may be performed in accordance with examples as disclosed herein. In some examples, aspects of the operations of 1520 may be performed by an RF resource manager 1130 as described with reference to FIG. 11.

At 1525, the method may include selecting the first resource partition for the contemporaneous communications of both the first SIM and the second SIM based on the determining. The operations of 1525 may be performed in accordance with examples as disclosed herein. In some examples, aspects of the operations of 1525 may be performed by an RF resource manager 1130 as described with reference to FIG. 11.

Figure 16:
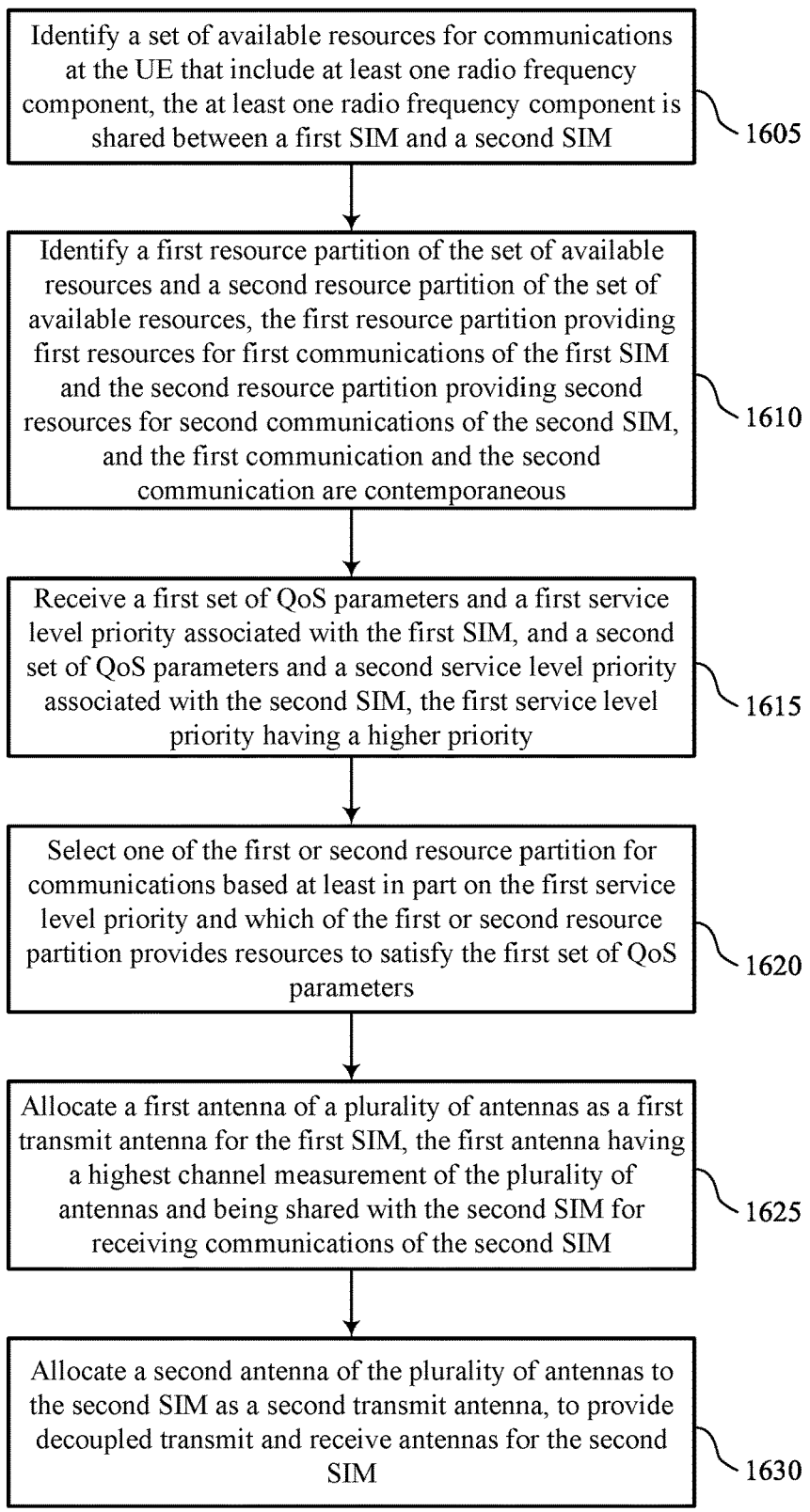

FIG. 16 shows a flowchart illustrating a method 1600 that supports SIM prioritization techniques based on service priority and quality of service parameters in accordance with aspects of the present disclosure. The operations of the method 1600 may be implemented by a UE or its components as described herein. For example, the operations of the method 1600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1605, the method may include identifying a set of available resources for communications at the UE that include at least one radio frequency component, the at least one radio frequency component is shared between a first SIM and a second SIM. The operations of 1605 may be performed in accordance with examples as disclosed herein. In some examples, aspects of the operations of 1605 may be performed by an RF component manager 1125 as described with reference to FIG. 11.

At 1610, the method may include identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous. The operations of 1610 may be performed in accordance with examples as disclosed herein. In some examples, aspects of the operations of 1610 may be performed by an RF resource manager 1130 as described with reference to FIG. 11.

At 1615, the method may include receiving a first set of quality of service parameters and a first service level priority associated with the first SIM, and a second set of quality of service parameters and a second service level priority associated with the second SIM, the first service level priority having a higher priority than the second service level priority. The operations of 1615 may be performed in accordance with examples as disclosed herein. In some examples, aspects of the operations of 1615 may be performed by a QoS manager 1135 as described with reference to FIG. 11.

At 1620, the method may include selecting one of the first resource partition or the second resource partition for communications based on the first service level priority and which of the first resource partition or the second resource partition provides resources to satisfy the first set of quality of service parameters. The operations of 1620 may be performed in accordance with examples as disclosed herein. In some examples, aspects of the operations of 1620 may be performed by an RF resource manager 1130 as described with reference to FIG. 11. In some cases, the first resource partition and the second resource partition being determined based on whether the contemporaneous communications use a transmit-sharing DSDA configuration or a full-concurrency DSDA configuration.

At 1625, the method may include allocating a first antenna of a set of multiple antennas as a first transmit antenna for the first SIM, the first antenna having a highest channel measurement of the set of multiple antennas, and the first antenna being shared with the second SIM for receiving communications of the second SIM. The operations of 1625 may be performed in accordance with examples as disclosed herein. In some examples, aspects of the operations of 1625 may be performed by an RF resource manager 1130 as described with reference to FIG. 11.

At 1630, the method may include allocating a second antenna of the set of multiple antennas to the second SIM as a second transmit antenna, to provide decoupled transmit and receive antennas for the second SIM. The operations of 1630 may be performed in accordance with examples as disclosed herein. In some examples, aspects of the operations of 1630 may be performed by an RF resource manager 1130 as described with reference to FIG. 11.

The following provides an overview of aspects of the present disclosure:

Aspect 1: A method for wireless communication, comprising: identifying a set of available resources for communications at the UE that include at least one radio frequency component, the at least one radio frequency component is shared between a first subscriber identification module (SIM) and a second SIM; identifying a first resource partition of the set of available resources and a second resource partition of the set of available resources, the first resource partition providing first resources for first communications of the first SIM and the second resource partition providing second resources for second communications of the second SIM, and the first communication and the second communication are contemporaneous; receiving a first set of quality of service parameters and a first service level priority associated with the first SIM, and a second set of quality of service parameters and a second service level priority associated with the second SIM, the first service level priority having a higher priority than the second service level priority; and selecting one of the first resource partition or the second resource partition for communications based at least in part on the first service level priority and which of the first resource partition or the second resource partition provides resources to satisfy the first set of quality of service parameters.

Aspect 2: The method of aspect 1, wherein the selecting comprises: determining that the first resource partition provides antenna switching diversity sufficient to meet the first set of quality of service (QoS) parameters; and selecting the first resource partition for the concurrent communications of both the first SIM and the second SIM based on the determining.

Aspect 3: The method of aspect 2, further comprising: assigning a first subset of receive radio frequency components associated with the first resource partition to the first SIM, the first subset of receive radio frequency components including a first number of receive antennas; selecting a second number of transmit antennas based at least in part on one or more measurements at each of the receive antennas; and assigning a remaining number of transmit antennas of the set of available resources to the second resource partition for the second SIM.

Aspect 4: The method of aspect 3, further comprising: granting authority to a controller associated with the first SIM to select the first subset of receive radio frequency components and the second number of transmit antennas.

Aspect 5: The method of aspect 4, further comprising: providing the controller associated with the first SIM control over one or more radio frequency components including one or more band select switches, antenna switch control, power amplifier control, or any combinations thereof.

Aspect 6: The method of any of aspects 1 through 5, wherein the radio frequency components that are shared among a first SIM and the second SIM include one or more transmit chains, one or more transmit power amplifiers, one or more receive chains, one or more receive low noise amplifiers, one or more antenna switches, one or more antennas, one or more band select switches, or any combinations thereof.

Aspect 7: The method of any of aspects 1 through 6, wherein the selecting comprises: determining that the first resource partition provides a highest capability for transmit antenna selection based on the first QoS parameters; and selecting the first resource partition for the concurrent communications of both the first SIM and the second SIM based on the determining.

Aspect 8: The method of any of aspects 1 through 7, wherein the first service level priority and the second service level priority are determined based at least in part on a service level priority order.

Aspect 9: The method of aspect 8, wherein the first service level priority and the second service level priority are further determined based at least in part on a mapping between an application associated with communications of each SIM and an associated priority of the application in the service level priority order.

Aspect 10: The method of aspect 9, wherein the first service level priority and the second service level priority are determined at a higher layer protocol level that is above a physical layer protocol level that assigns resource partitions.

Aspect 11: The method of any of aspects 1 through 10, wherein the concurrent communications of both the first SIM and the second SIM are full-concurrency communications and each of the first resource partition and the second resource partition include at least one power amplifier for concurrent transmissions of both the first SIM and the second SIM at any given time instance.

Aspect 12: The method of any of aspects 1 through 11, wherein the first resource partition and the second resource partition are determined based at least in part on whether the concurrent communications use a transmit-sharing dual-SIM dual-active (DSDA) configuration or a full-concurrency DSDA configuration.

Aspect 13: The method of aspect 12, wherein the first SIM is allocated resources of the set of available resources in which transmit and receive components are coupled for transmit-sharing DSDA, based at least in part on the first service level priority associated with the first SIM.

Aspect 14: The method of aspect 13, wherein at least a first transmit component is shared by both the first SIM and the second SIM, and the second SIM suspends communications when the first SIM uses the first transmit component, based at least in part on the second service level priority associated with the second SIM.

Aspect 15: The method of any of aspects 13 through 14, wherein the second SIM is allocated resources of the set of available resources in which one or more transmit and receive components are decoupled for transmit-sharing DSDA.

Aspect 16: The method of any of aspects 12 through 15, further comprising: allocating a first antenna of a plurality of antennas as a first transmit antenna for the first SIM, the first antenna having a highest channel measurement of the plurality of antennas, and the first antenna being shared with the second SIM for receiving communications of the second SIM, and allocating a second antenna of the plurality of antennas to the second SIM as a second transmit antenna, to provide decoupled transmit and receive antennas for the second SIM.

Aspect 17: An apparatus for wireless communication, comprising a processor; memory coupled with the processor; and instructions stored in the memory and executable by the processor to cause the apparatus to perform a method of any of aspects 1 through 16.

Aspect 18: An apparatus for wireless communication, comprising at least one means for performing a method of any of aspects 1 through 16.

Aspect 19: A non-transitory computer-readable medium storing code for wireless communication, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
    identifying a set of available resources for communications at a user equipment (UE) that include at least one radio frequency component, the at least one radio frequency component is shared between a first subscriber identification module (SIM) and a second SIM;
    identifying a first resource partition of the set of available resources and a second resource partition of the set of available resources, the first resource partition comprising a first quantity of resources of the set of available resources with antenna switching diversity for the first SIM and a second quantity of resources of the set of available resources limiting antenna switching diversity for the second SIM and the second resource partition comprising a third quantity of resources of the set of available resources limiting antenna switching diversity for the first SIM and a fourth quantity of resources of the set of available resources with antenna switching diversity for the second SIM, wherein communications of the first SIM and communications of the second SIM are contemporaneous and the antenna switching diversity is limited by insufficient resources for contemporaneous antenna switching diversity for the first SIM and the second SIM;

receiving a first set of quality of service requirements and a first service level priority associated with the first SIM, and a second set of quality of service requirements and a second service level priority associated with the second SIM, the first service level priority having a higher priority than the second service level priority; and selecting one of the first resource partition or the second resource partition for communications based at least in part on the first service level priority and which of the first resource partition or the second resource partition provides resources to satisfy the first set of quality of service requirements.

2. The method of claim 1, wherein the selecting comprises:
determining that the first resource partition provides antenna switching diversity sufficient to meet the first set of quality of service requirements; and
selecting the first resource partition for the contemporaneous communications of both the first SIM and the second SIM based on the determining.

3. The method of claim 2, further comprising:
assigning a first subset of receive radio frequency components associated with the first resource partition to the first SIM, the first subset of receive radio frequency components including a first number of receive antennas;
selecting a second number of transmit antennas based at least in part on one or more measurements at each of the receive antennas; and
assigning a remaining number of transmit antennas of the set of available resources to the second resource partition for the second SIM.

4. The method of claim 3, further comprising:
granting authority to a controller associated with the first SIM to select the first subset of receive radio frequency components and the second number of transmit antennas.

5. The method of claim 4, further comprising:
providing the controller associated with the first SIM control over one or more radio frequency components including one or more band select switches, antenna switch control, power amplifier control, or any combinations thereof.

6. The method of claim 1, wherein the at least one radio frequency component that is shared among the first SIM and the second SIM includes one or more transmit chains, one or more transmit power amplifiers, one or more receive chains, one or more receive low noise amplifiers, one or more antenna switches, one or more antennas, one or more band select switches, or any combinations thereof.

7. The method of claim 1, wherein the selecting comprises:
determining that the first resource partition provides a highest capability for transmit antenna selection based on the first set of quality of service requirements; and
selecting the first resource partition for the contemporaneous communications of both the first SIM and the second SIM based on the determining.

8. The method of claim 1, wherein the first service level priority and the second service level priority are determined based at least in part on a service level priority order.

9. The method of claim 8, wherein the first service level priority and the second service level priority are further determined based at least in part on a mapping between an application associated with communications of each SIM and an associated priority of the application in the service level priority order.

10. The method of claim 9, wherein the first service level priority and the second service level priority are determined at a higher layer protocol level that is above a physical layer protocol level that assigns resource partitions.

11. The method of claim 1, wherein the contemporaneous communications of both the first SIM and the second SIM are full-concurrency communications and each of the first resource partition and the second resource partition include at least one power amplifier for concurrent transmissions of both the first SIM and the second SIM at any given time instance.

12. The method of claim 1, wherein the first resource partition and the second resource partition are determined based at least in part on whether the contemporaneous communications use a transmit-sharing dual-SIM dual-active (DSDA) configuration or a full-concurrency DSDA configuration.

13. The method of claim 12, wherein the first SIM is allocated resources of the set of available resources in which transmit and receive components are coupled for transmit-sharing DSDA, based at least in part on the first service level priority associated with the first SIM.

14. The method of claim 13, wherein at least a first transmit component is shared by both the first SIM and the second SIM, and the second SIM suspends communications when the first SIM uses the first transmit component, based at least in part on the second service level priority associated with the second SIM.

15. The method of claim 13, wherein the second SIM is allocated resources of the set of available resources in which one or more transmit and receive components are decoupled for transmit-sharing DSDA.

16. The method of claim 12, further comprising:
allocating a first antenna of a plurality of antennas as a first transmit antenna for the first SIM, the first antenna having a highest channel measurement of the plurality of antennas, and the first antenna being shared with the second SIM for receiving communications of the second SIM, and
allocating a second antenna of the plurality of antennas to the second SIM as a second transmit antenna, to provide decoupled transmit and receive antennas for the second SIM.

17. An apparatus for wireless communication, comprising:
a processor;
memory coupled with the processor; and instructions stored in the memory and executable by the processor to cause the apparatus to:

identify a set of available resources for communications at a user equipment (UE) that include at least one radio frequency component, the at least one radio frequency component is shared between a first subscriber identification module (SIM) and a second SIM;

identify a first resource partition of the set of available resources and a second resource partition of the set of available resources, the first resource partition comprising a first quantity of resources of the set of available resources with antenna switching diversity for the first SIM and a second quantity of resources of the set of available resources limiting antenna switching diversity for the second SIM and the second resource partition comprising a third quantity of resources of the set of available resources limiting antenna switching diversity for the first SIM and a fourth quantity of resources of the set of available resources with antenna switching diversity for the second SIM, wherein communications of the first SIM and communications of the second SIM are contemporaneous and the antenna switching diversity is limited by insufficient resources for contemporaneous antenna switching diversity for the first SIM and the second SIM;

receive a first set of quality of service requirements and a first service level priority associated with the first SIM, and a second set of quality of service requirements and a second service level priority associated with the second SIM, the first service level priority having a higher priority than the second service level priority; and select one of the first resource partition or the second resource partition for communications based at least in part on the first service level priority and which of the first resource partition or the second resource partition provides resources to satisfy the first set of quality of service requirements.

18. The apparatus of claim 17, wherein the instructions to select are executable by the processor to cause the apparatus to:

determine that the first resource partition provides antenna switching diversity sufficient to meet the first set of quality of service requirements; and select the first resource partition for the contemporaneous communications of both the first SIM and the second SIM based on the determining.

19. The apparatus of claim 18, wherein the instructions are further executable by the processor to cause the apparatus to:

assign a first subset of receive radio frequency components associated with the first resource partition to the first SIM, the first subset of receive radio frequency components including a first number of receive antennas;

select a second number of transmit antennas based at least in part on one or more measurements at each of the receive antennas; and assign a remaining number of transmit antennas of the set of available resources to the second resource partition for the second SIM.

20. The apparatus of claim 19, wherein the instructions are further executable by the processor to cause the apparatus to:

grant authority to a controller associated with the first SIM to select the first subset of receive radio frequency components and the second number of transmit antennas; and provide the controller associated with the first SIM control over one or more radio frequency components including one or more band select switches, antenna switch control, power amplifier control, or any combinations thereof.

21. The apparatus of claim 17, wherein the at least one radio frequency component that is shared among the first SIM and the second SIM include one or more transmit chains, one or more transmit power amplifiers, one or more receive chains, one or more receive low noise amplifiers, one or more antenna switches, one or more antennas, one or more band select switches, or any combinations thereof.

22. The apparatus of claim 17, wherein the instructions to select are executable by the processor to cause the apparatus to:

determine that the first resource partition provides a highest capability for transmit antenna selection based on the first set of quality of service requirements; and select the first resource partition for the contemporaneous communications of both the first SIM and the second SIM based on the determining.

23. The apparatus of claim 17, wherein the first service level priority and the second service level priority are determined based at least in part on a service level priority order.

24. The apparatus of claim 23, wherein the first service level priority and the second service level priority are further determined based at least in part on a mapping between an application associated with communications of each SIM and an associated priority of the application in the service level priority order.

25. The apparatus of claim 17, wherein the first resource partition and the second resource partition are determined based at least in part on whether the contemporaneous communications use a transmit-sharing dual-SIM dual-active (DSDA) configuration or a full-concurrency DSDA configuration.

26. The apparatus of claim 25, wherein the instructions are further executable by the processor to cause the apparatus to:

allocate a first antenna of a plurality of antennas as a first transmit antenna for the first SIM, the first antenna having a highest channel measurement of the plurality of antennas, and the first antenna being shared with the second SIM for receiving communications of the second SIM, and allocate a second antenna of the plurality of antennas to the second SIM as a second transmit antenna, to provide decoupled transmit and receive antennas for the second SIM.

27. An apparatus for wireless communication, comprising:

means for identifying a set of available resources for communications at a user equipment (UE) that include at least one radio frequency component, the at least one radio frequency component is shared between a first subscriber identification module (SIM) and a second SIM;

means for identifying a first resource partition of the set of available resources and a second resource partition of the set of available resources, the first resource partition comprising a first quantity of resources of the set of available resources with antenna switching diversity for the first SIM and a second quantity of resources of the set of available resources limiting antenna switching diversity for the second SIM and the second resource partition comprising a third quantity of resources of the set of available resources limiting antenna switching diversity for the first SIM and a fourth quantity of resources of the set of available resources with antenna switching diversity for the second SIM, wherein communications of the first SIM and communications of the second SIM are contemporaneous and the antenna switching diversity is limited by insufficient resources f or contemporaneous antenna switching diversity for the first SIM and the second SIM;

means for receiving a first set of quality of service requirements and a first service level priority associated with the first SIM, and a second set of quality of service requirements and a second service level priority associated with the second SIM, the first service level priority having a higher priority than the second service level priority; and means for selecting one of the first resource partition or the second resource partition for communications based at least in part on the first service level priority and which of the first resource partition or the second resource partition provides resources to satisfy the first set of quality of service requirements.

28. The apparatus of claim 27, wherein the means for the selecting comprise:

means for determining that the first resource partition provides antenna switching diversity sufficient to meet the first set of quality of service requirements; and means for selecting the first resource partition for the contemporaneous communications of both the first SIM and the second SIM based on the determining.

29. A non-transitory computer-readable medium storing code for wireless communication, the code comprising instructions executable by a processor to:

identify a set of available resources for communications at a user equipment (UE) that include at least one radio frequency component, the at least one radio frequency component is shared between a first subscriber identification module (SIM) and a second SIM;

identify a first resource partition of the set of available resources and a second resource partition of the set of available resources, the first resource partition comprising a first quantity of resources of the set of available resources with antenna switching diversity for the first SIM and a second quantity of resources of the set of available resources limiting antenna switching diversity for the second SIM and the second resource partition comprising a third quantity of resources of the set of available resources limiting antenna switching diversity for the first SIM and a fourth quantity of resources of the set of available resources with antenna switching diversity for the second SIM, wherein communications of the first SIM and communications of the second SIM are contemporaneous and the antenna switching diversity is limited by insufficient resources for contemporaneous antenna switching diversity for the first SIM and the second SIM;

receive a first set of quality of service requirements and a first service level priority associated with the first SIM, and a second set of quality of service requirements and a second service level priority associated with the second SIM, the first service level priority having a higher priority than the second service level priority; and select one of the first resource partition or the second resource partition for communications based at least in part on the first service level priority and which of the first resource partition or the second resource partition provides resources to satisfy the first set of quality of service requirements.

30. The non-transitory computer-readable medium of claim 29, wherein the instructions to select are executable by the processor to:

determine that the first resource partition provides antenna switching diversity sufficient to meet the first set of quality of service requirements; and select the first resource partition for the contemporaneous communications of both the first SIM and the second SIM based on the determining.

* * * * *